US012711833B1

(12) United States Patent
Stousland et al.

(10) Patent No.: US 12,711,833 B1
(45) Date of Patent: Aug. 18, 2026

(54) HOT SLOTS PLAYER ENGAGEMENT AND DECISION MAKING SYSTEM

(71) Applicant: Slot Check, Inc., Middleton, WI (US)

(72) Inventors: Grant Stousland, Middleton, WI (US); Ian Vincent Bassett, Swansea (GB); Frank Stagg Rogers, Sr., Charlotte, NC (US); James Adam McKenzie, Cottage Grove, WI (US); Woody Guthrie Wallace, Madison, WI (US)

(73) Assignee: SLOT CHECK, INC, Madison, WI (US)

( * ) Notice: Subject to any disclaimer, the term of this patent is extended or adjusted under 35 U.S.C. 154(b) by 0 days.

(21) Appl. No.: 17/333,170

(22) Filed: May 28, 2021

Related U.S. Application Data

(60) Provisional application No. 63/031,149, filed on May 28, 2020.

(51) Int. Cl.
*G07F 17/32* (2006.01)

(52) U.S. Cl.
CPC ...... *G07F 17/3237* (2013.01); *G07F 17/3262* (2013.01)

(58) Field of Classification Search
CPC ........................................................ G07F 17/34
See application file for complete search history.

(56) References Cited

U.S. PATENT DOCUMENTS 8,998,707 B2 4/2015 Amone et al.
9,754,443 B2 9/2017 Hedrick et al.
9,881,448 B2 1/2018 Arnone et al.
10,198,905 B2 2/2019 Arnone et al.
2004/0106449 A1* 6/2004 Walker ................ G07F 17/3227 463/25
2007/0155490 A1 7/2007 Philips et al.
2008/0164908 A1* 7/2008 Challenger ........... G06F 9/4494 326/46
2008/0189269 A1* 8/2008 Olsen .................... G06F 16/951 707/999.005
2010/0227662 A1* 9/2010 Speer, II ............. G07F 17/3227 463/16
2011/0009181 A1* 1/2011 Speer, II ............. G07F 17/3227 463/20
2011/0183762 A1 7/2011 Topham et al.
2011/0306400 A1* 12/2011 Nguyen .............. G07F 17/3241 463/20
2013/0184060 A1* 7/2013 Costello .............. G07F 17/3241 463/22

(Continued)

*Primary Examiner* — Jasson H Yoo

(74) *Attorney, Agent, or Firm* — Kerr IP Group, LLC

(57) ABSTRACT

A player engagement system and method for planning a gaming experience, selecting an electronic gaming machine (EGM) from a plurality of EGMs, and monitoring game play for a plurality of EGMs is described herein. A network appliance receives EGM information from a casino management system and identifies player selectable variables associated with the EGM information. The player selectable variables include and are assessed according to a player selectable time range. The network appliance pushes a ranked and filtered player selectable variable data set to a player client device in response to a player input instruction received by the player client device. The ranked and filtered player selectable variable data set is presented on the client device.

8 Claims, 15 Drawing Sheets

(56) References Cited

U.S. PATENT DOCUMENTS

| | | | | |
|---|---|---|---|---|
| 2013/0316818 | A1* | 11/2013 | Earley | G07F 17/3227 463/31 |
| 2015/0279213 | A1* | 10/2015 | Balter | G07B 15/02 705/13 |
| 2020/0184776 | A1 | 6/2020 | Higgins et al. | |
| 2020/0279454 | A1* | 9/2020 | Meyer | G07F 17/3232 |
| 2021/0166524 | A1* | 6/2021 | DeRosa | G07F 17/3213 |

* cited by examiner

FIGURE 10
1000
9:41
1002
1004
MY PLAY
♥ MY FAVORITES
Last Visit
Month
1006
1010
Slots
Session
My Play
1 Triple Double Star
2
1 hr 10 min
2 Triple Double Star 02
3
45 min
3 Dreams of Egypt
2
33 min
4 Game King 8.3
2
31 min
5 50 Dragons
3
20 min
6 Video Poker
2
16 min
7 Triple Stars
5
9 min
8 Triple Stars 9898
3
9 min
9 Game King 8.3 R 0908
6
31 min
10 50 Dragons
20 min
1008

1400

HOT SLOTS PLAYER ENGAGEMENT AND DECISION MAKING SYSTEM

CROSS REFERENCE

This patent application claims the benefit of provisional patent application 63/031,149 entitled SYSTEM AND METHOD TO INFLUENCE AND FACILITATE PLAYER ENGAGEMENT AND PLAYER GAMING DECISION-MAKING filed on May 28, 2020; and the patent application identified above is incorporated by reference in this patent application filing.

FIELD

The present disclosure relates to a hot slots player engagement decision making system. More particularly, the systems and methods provide casino patrons with empirical slot performance information arranged and viewable in a manner that is easily digestible to casino patrons in order to influence casino patrons' game selection decisions.

BACKGROUND

The majority of players served by the casino gaming industry are between the age of 51 and 80 years old, and this demographic continues to shrink. Thus, one material concern in the casino industry is how to attract younger customers. Unlike many players in this older demographic, younger customers interact with their personal mobile devices, e.g., smartphones. This younger demographic prefers online social mobile apps that include social games and online social casinos.

Social casinos, unlike land-based casinos, do not require a physical presence to enjoy a gaming experience. The brick and mortar casino gaming industry has experienced competition in recent years from the advent of online social casinos, such as Big Fish and Double Down, and from the legalization of online real-money gambling in certain jurisdictions. Brick and mortar casinos remain separate from online social games, such as Candy Crush and Angry Birds, and online social casinos such as Big Fish and Double Down and real-money online casinos.

Since the advent of the slot machine, players have wanted to know if the next spin will be a winning spin or a losing spin. Many players also hold the belief that certain recent empirical patterns of play on a slot machine, if known, will allow the player to analyze and predict future outcomes as to which machines will be "hot" (likely to payout) and which will not likely payout.

Slot machines are typically driven by a random number generator or a central determination system, which is required in regulated markets. Thus, the outcome for each individual spin is random. These random outcomes are common knowledge to casino patrons and casino properties.

Gaming establishments, i.e., casino properties, are continually looking to increase their acquisition, frequency and spend. "Acquisition" refers to attracting new customers, which are the younger customers. Additionally, gaming establishments also want to increase the frequency that patrons visit their casino, which is referred to as "frequency." Casino properties also want to increase the amount of money that casino patrons spend per visit, which is referred to as "spend." The "spend" is based on the average daily theoretical spend.

Thus, there is a need for gaming establishments to create more player engagement, which leads to more new players and more frequent casino visits per customer, which results in increased spend per visit.

Additionally, there is a need for a system and method to influence and facilitate player engagement and gaming decision-making.

Furthermore, there is a long-felt need on behalf of casino operators in the industry to attract younger players through social and online feature integration with existing gaming technologies.

SUMMARY

A casino patron engagement system for planning a gaming experience, selecting an electronic gaming machine (EGM) from a plurality of EGMs, and monitoring game play for a plurality of EGMs is described. In the illustrative embodiment, the system includes a casino management system, a network appliance, and a player client device. The casino management system is communicatively coupled to EGMs, in which each EGM generates a plurality of EGM information. The network appliance is communicatively coupled to the casino management system. The network appliance includes a database that receives EGM information from the EGMs. The network appliance identifies a player selectable variables that is associated with the EGM information, in which each casino patron selectable variable includes a player selectable time range. The player client device is communicatively coupled to the network appliance. The player client device includes a local memory, a local processor, and a local application that operates on the player client device using computing resources from the network appliance, the local memory, and the local processor.

A player input instruction is received by the player client device. The player input instruction includes the player selectable time range for at least one player selectable variable associated with the EGM information from the plurality of EGMs.

The network appliance receives the player input instruction and generates a filtered player selectable variable data set according to the player selectable time range corresponding to the player selectable variable. The network appliance ranks the filtered player selectable variable data set for one or more EGMs. The network appliance also selects a tiered subset of the one or more EGMs ranked and filtered player selectable variable data set. Additionally, the network appliance identifies a location of each EGM on a map. Each EGM displayed on the map is associated with the tiered subset of EGMs that have been ranked according to the filtered player selectable variable data set.

The player client device receives the map and displays the map having the location of each EGM that is associated with the tiered subset of EGMs, which have been ranked and filtered according to the player selectable variable data set.

In one embodiment, the player selectable variables include one or more categories selected from a group consisting of a return to player variable, a percent winning spin variable, a win per spin variable, a money played variable, a money won variable, a number of jackpots variable, a jackpot money variable, a number of spins variable, a sleeper slot EGM variable, a high volatility EGM variable, and a low volatility EGM variable.

In another embodiment, the player selectable time range includes at least one of an hour, a day, a week, a month, a time since last visit, and a time since last jackpot.

In a further embodiment, the EGM information includes at least one of a game session result, an EGM location, an EGM serial number, a game ID, a game name, a coin-in amount, a coin-out amount, a jackpot awarded amount, an active player count, a casino EGM number, an EGM type, and an EGM brand.

In a still further embodiment, the player client device includes a casino patron smartphone that receives the player input instruction and the map having the location of each EGM, which is associated with the tiered subset of EGMs that have been ranked and filtered according to the player selectable variable data set.

In an even further embodiment, the network appliance includes a network appliance database, and the casino management system includes a casino management database that operates independently from the network appliance database.

An alternative casino patron engagement system is also described. This alternative embodiment includes an integrated casino management system and a player client device. In the integrated casino management system, the operation of the previously described casino management system and network appliance are combined in the integrated casino management system so that only one database is accessed, namely, the integrated casino management system database.

The integrated casino management system is communicatively coupled to a plurality of EGMs, in which each EGM generates EGM information. The integrated casino management system includes a database that receives EGM information from the plurality of EGMs. The integrated casino management system identifies a plurality of player selectable variables that are associated with the EGM information, in which each player selectable variable includes a player selectable time range. The player client device is communicatively coupled to the integrated casino management system. The player client device includes a local memory, a local processor, and a local application that operates on the player client device using computing resources from the network appliance, the local memory, and the local processor. The player input instruction, received by the player client device, includes the player selectable time range for at least one player selectable variable that is associated with the EGM information from the plurality of EGMs. The integrated casino management system receives the player input instruction and generates a filtered player selectable variable data set according to the player selectable time range corresponding to the player selectable variable.

The integrated casino management system ranks the filtered player selectable variable data set for one or more EGM. The integrated casino management system selects a tiered subset of the one or more EGMs ranked and filtered player selectable variable data set. The integrated casino management system identifies, on a map, a location of each EGM, which is associated with the tiered subset of EGMs that have been ranked according to the filtered player selectable variable data set. The player client device receiving the map and displaying the map having the location of each EGM, which is associated with the tiered subset of EGMs that have been ranked and filtered according to the player selectable variable data set.

In one embodiment, the integrated casino management system also identifies whether each EGM on the map is occupied by a player, which is represented on the map as a dot next each occupied EGM.

BRIEF DESCRIPTION OF THE FIGURES

The present invention will be more fully understood by reference to the following drawings which are presented for illustrative, not limiting, purposes.

DETAILED DESCRIPTION

Figure 1:
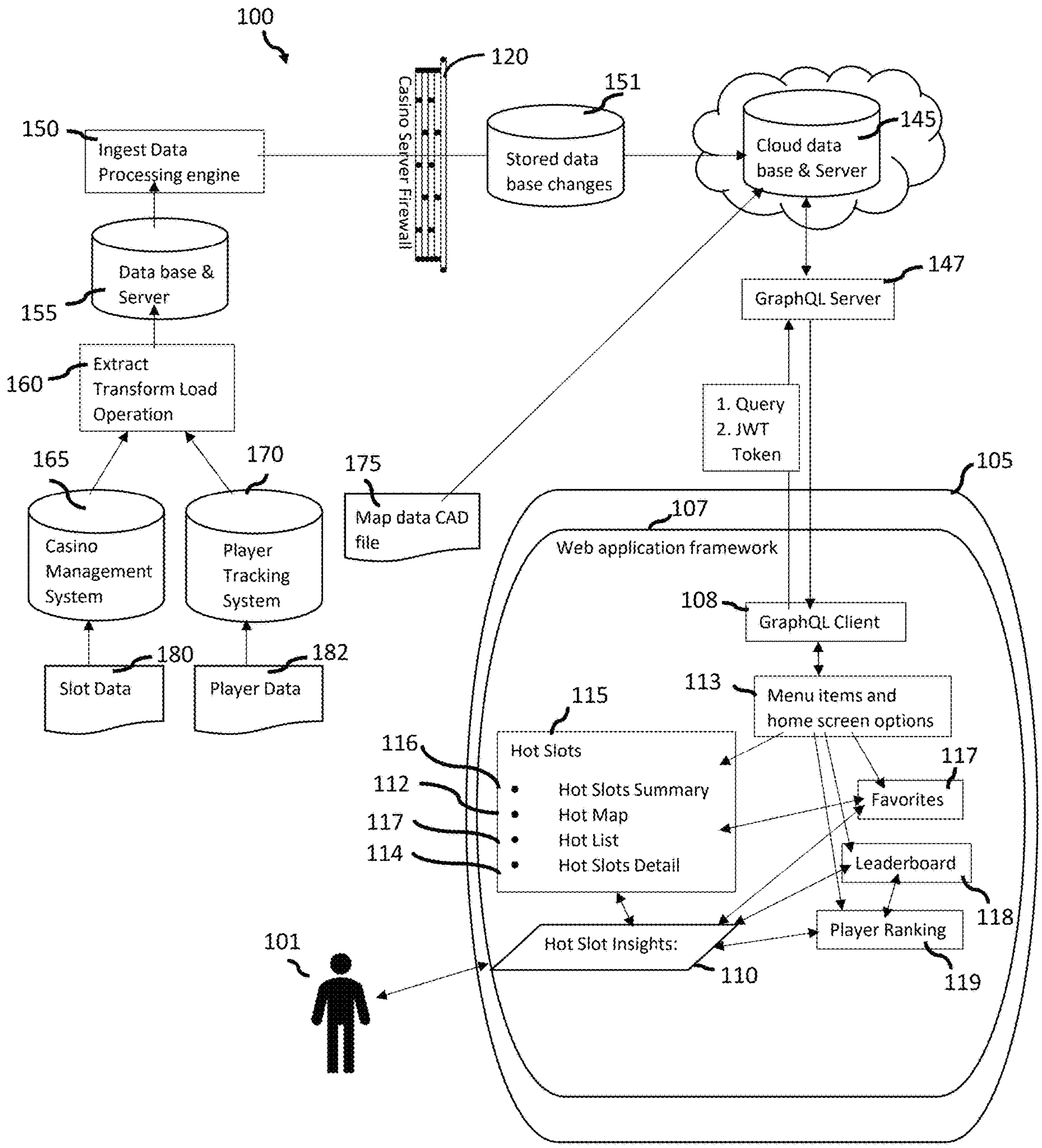
FIG. 1 shows an illustrative casino patron engagement system for hot slots player engagement and decision making.

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the systems and methods described herein may vary as to configuration and as to details. The following detailed description of the illustrative embodiments includes reference to the accompanying drawings, which form a part of this application. The drawings show, by way of illustration, specific embodiments in which the invention may be practiced. It is to be understood that other embodiments may be utilized, and structural changes may be made without departing from the scope of the claims.

The hot slots player engagement decision making system described herein is a casino patron engagement system and method that provides access to empirical slot performance information, which facilitates a social and interactive gaming experience. The casino patron engagement systems and methods share empirical slot performance data with casino patrons, through a "Hot Slots" mobile application that operates on a personal mobile device.

Historically, empirical slot performance data has been the exclusive purview of casino operators, testing laboratories and gaming regulators per any given jurisdiction. The systems and methods described herein access this empirical slot performance data and make is accessible to casino patrons via a mobile application that runs on a personal mobile device, e.g., a smartphone. Note, for purposes of this patent the term "casino patron" is used interchangeably with the term "player."

By providing access to the real-time slot performance data, the player engagement system and method create the perception, to the casino patron, of levelling the odds with the casino property. Simply put, the slot performance data may be used by the player to plan a gaming experience, select an electronic gaming machine (EGM) from a plurality of EGMs, and monitoring game play for one or more EGMs. Note, that term "slot machine" and electronic gaming machine (EGM) are used interchangeably for purposes of this patent.

The illustrative player engagement systems and methods described herein includes a client device that executes an application that casino patrons can use to visualize the EGM performance information at a casino property.

In the illustrative embodiment, the casino property streams play data to a cloud based network appliance, which stores the play data in a time series database that has mapping capabilities. The cloud based network appliance provides cloud services that include, by way of example and not of limitation, a streaming application programming interface (API), a graphql API, a database, a mobile application, and a web application.

The systems and methods described herein operate by streaming casino patron from the casino management system (CMS) to a cloud-based database, which aggregates the slot performance information and performs real-time statistical analysis. Additionally, the systems and methods described allows players to share their location with friends, be listed on leader boards, join online social games with other players in the casino, and exchange opinions on reviews of casino games. Social interaction in such a system is appealing to many players that wish to share some of their gaming experience with friends, or other players (i.e., potential friends) that may be made online.

In one embodiment, the system and method provide analysis of empirical slot performance data upon which players can base their game play as per their individual beliefs as to which EGMs will be most monetarily advantageous and/or entertaining. The illustrative system provides the player(s) with a geospatially accurate indoor way finder map so that they can easily locate the desired EGM. This set of in-app player engagement and player decision making features are referred to interchangeably as "Hot Slots" and the "Hot Slot Application."

Moreover, the system and methods described herein promotes player engagement with the use of "meta-games," which refers to games within a game. Social Interactive Casino Games™ (SIC games) are online social games that are played on personal mobile device and then the player interacts with an EGM at the casino property. SIC games bring together online social games and land-based casino games. In one illustrative embodiment, the SIC game may require the player to play one or more EGMs on the casino floor to advance game play for the SIC Game. The various SIC Games may also be interchangeably referred to as "Fun Games."

The systems and methods described herein satisfy the casino property's three key performance indicators, namely, acquisition, frequency and spend as described above. More specifically, the inventors hypothesize that the "Fun Games" supported by the hot slots player engagement decision making system improves the casino property's acquisition, frequency and spend. Additionally, combining online social games with EGM game play creates an enhanced gaming and entertainment experience that promotes player driven engagement, influences player decision-making and increases casino patron loyalty.

In the illustrative embodiment, a "casino" API associated with a cloud based server component, i.e., a network appliance, permits a Casino Management System (CMS) to push data to a network appliance database. By way of example and not of limitation, a streaming API based on AWS Kinesis is deployed. Optionally, a python SDK will push data to the API and Kinesis Firehose will write to an AWS s3 database. A lambda function inserts data from each data stream received from the casino property into an illustrative TimescaleDB database, which is a Postgres database with extensions. Other relational data about the casino property and casino patron may be updated via a graphql database or other end point provided by the casino API.

Additionally, the illustrative embodiment describes players logging into a mobile application, which will create GraphQL subscriptions with a Hasura GraphQL Engine running in the cloud. The GraphQL Engine queries the network appliance database and returns the results to the mobile application. As the data in the database changes, Hasura pushes updates to subscribing clients. Other services and actions responsive to GraphQL requests are fulfilled via AWS lambda functions. Authentication is performed by AWS cognito.

Embodiments of the present invention may be implemented as a computer program product, which may include an application downloadable to smartphones and other mobile devices from a web site such as those offered by Apple and Google or as a web app that is accessible from the world wide web through a web browser such as Google Chrome, Firefox, Internet Explorer, or other such browser.

In some embodiments, the methods, systems, and media disclosed herein include software, server, and/or database modules, or use of the same. Software modules and software components are created by techniques known to those of skill in the art using machines, software, and languages known in the art. The software modules described herein are implemented in a multitude of ways. In various embodiments, a software module includes a file, a section of code, a programming object, a programming structure, or combinations thereof. In further embodiments, a software module includes a plurality of files, a plurality of sections of code, a plurality of programming objects, a plurality of programming structures, or any combination thereof. In various embodiments, the one or more software modules include a web application, a mobile application, and a standalone application. In some embodiments, software modules are in one computer program or application. In other embodiments, software modules are in more than one computer program or application. Software modules may also be hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

In some embodiments, the methods, systems, and media disclosed herein integrate with or include one or more databases. Those of skill in the art shall recognize that many databases are suitable for storage and retrieval of player and game information. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based in one or more local computer storage devices.

Referring to FIG. 1 there is shown an illustrative casino patron engagement system for hot slots player engagement and decision making. The illustrative hot slot player engagement and decision making system 100 includes a casino property system behind a casino server firewall 120, a cloud based system outside the firewall 120, and a client device 105. The "hot slot" system 100 may further include map data 175 for one or more casinos that is retrieved from a casino database behind the casino server firewall 120. In other embodiments, the map data 175 may be retrieved from a database that is not behind the casino server firewall 120.

The casino property system includes a plurality of EGM data 180 collected from EGMs and received by a casino management system (CMS) 165. In the illustrative embodiment, the casino property system also includes a plurality of player data 182 collected by a player tracking system 170. The EGM data 180 includes gaming device information and game session results from those gaming devices and may be organized into various fields. EGMs include class II and class III gaming devices, such as floor-mounted slot machines, video poker, keno-style gaming machines, and bingo gaming machines.

Game session results include session time, session date, session length, player ID, money wagered (coin-in), money lost, money won (coin-out), and bonus awarded. The player data 182 includes player activity associated with a player loyalty account and the activity thereon. In one embodiment, player data 182 includes records indicating that a player is actively playing a particular EGM, and therefore occupying that EGM. The EGM device information may also be referred to as "EGM information" and can include device identification number, device location, device brand, game name, associated property, and current status. The device identification number may include a casino EGM number, cabinet serial number, manufacturer identification number, unique device identification number, or any combination thereof. The current status data indicates whether a particular gaming machine is actively occupied or inactive and unoccupied.

By way of example and not of limitation, the CMS 165 operates software that is an all-in-one solution used to assist in the on-going management, monitoring, and operations of single- or multi-site casinos. CMS 165 features include slot management and accounting, display management, slot floor management, multi-site support, cage and credit accounting, player management, player and pit tracking, gaming reporting and analytics, cashless options, server based gaming, bonusing, mobile casino operations. In some embodiments, the CMS 165 also performs player tracking services, such as those provided by the player tracking system 170. In some embodiments, the player tracking system 170 is a casino operated system for tracking player activity within the casino through a player's loyalty account activity.

An Extract, Transform, Load (ETL) operation 160 copies the EGM data 180 and the player data 182 from the casino management system 165 and/or the player tracking system 182 into a compatible format for transmission to a database resident on a server 155 behind the casino server firewall 120. The received EGM data 180 and player data 182 is then processed with an ingest data processing engine 150 for transmission across the casino server firewall to the network appliance 145 or cloud based system. In other embodiments, the data is copied and/or further processed by a suite of applications and micro-services that enable different servers, data bases and data tables to talk to each other in a secure and reliable manner and with upload and download speeds that prevent noticeable lag when the user enjoys the various features on the mobile application.

The cloud based system also receives casino floor map data 175 through secure and/or non-secure server connections such as a casino website or other publicly available resource. In some embodiments, the casino floor map data 175 is received from a secure casino server across the casino server firewall 120.

A graphQL server 147 processes the various data received by the network appliance 145 for transmission from the cloud to the application 107 presented by a client device 105 display. In other embodiments, the data is processed by a suite of applications and micro-services that enable different servers, data bases and data tables to talk to each other in a secure and reliable manner and with upload and download speeds that prevent noticeable lag when the user enjoys the various features on the mobile application. The operations of the graphQL engine 147, may commonly be referred to as front-end services, because the graphQL engine 147 provides the player's user experiences on the front end while operating the application 107 on a client device 105.

In various embodiments, the operations of the ETL operation 160, the database resident on a server 155 behind the casino server firewall 120, the ingest data processing engine 150, the network appliance 145, and the graphQL server 147 are performed by a network appliance. By way of example and not of limitation, the network appliance may be embodied as one or more components, such as a cloud component, a cloud module, a virtual machine, a container, a local server, a WAN server, a gateway, or any combination thereof.

A client device 105 is authorized through the graphQL server 147 through the request and receipt of a JSON Web Token (JWT), which enables a graphQL client 108 resident in a web application framework 107 operating on the client device to receive a plurality of player selectable variables 110 data from the network appliance 145. Note, that for purposes of this patent the terms "player selectable variable(s)," "hot slot insight(s)," and "insight(s)" are used interchangeably.

The illustrative client device 105 includes a processor and memory (not shown) on which an application 107 operates to present curated data pertaining to gaming machine performance and player game play history on the client device 105 display (not shown), which allow players to plan a gaming experience. In various embodiments, the client device 105 includes, but is not limited to, a desktop, laptop, tablet, phablet, smart phone, mobile phone and other such client device.

The illustrative application 107 presents an assortment of historical insights for a plurality of EGMs in a format that allows players or users to select a category by which to compare the performance of one or more gaming machines, and from such comparison determine the identity and location of one or more gaming machines. The application 107 may be a mobile application, API, a web application, a progressive web application, or any combination thereof. As used herein, a web application may utilize one or more software frameworks and one or more database systems.

In some embodiments, a computer program includes a web application, a mobile application provided to a mobile digital processing device. In some embodiments, the mobile application is provided to a mobile digital processing device at the time it is manufactured. In other embodiments, the mobile application is provided to client device(s) 105 from the network appliance computer network 145. In some embodiments, a computer program includes a standalone application, which is a program that is run as an independent computer process, not an add-on to an existing process, e.g., not a plug-in. Those of skill in the art will recognize that mobile applications are written in any one or more of several coding languages.

These player selectable variables 110 are presented through the application 107 as summary views (i.e., Hot Slots Summary 116, Hot Map 112, Hot List 117, or Hot Slots Detail 114). These summary views are reached through home screen menu items 113. Competitive views can also be reached through the home screen menu items 113, such as Favorites 117, Leaderboard 118, and player ranking 119. In the illustrative embodiments, these views are updated in real time from the cloud server 145 based upon the slot data 180, the player data, or any combination thereof. In some embodiments, these updates include loyalty account activity, which may be used to determine whether a gaming machine is occupied or not occupied by a player actively playing the gaming machine.

Figure 2:
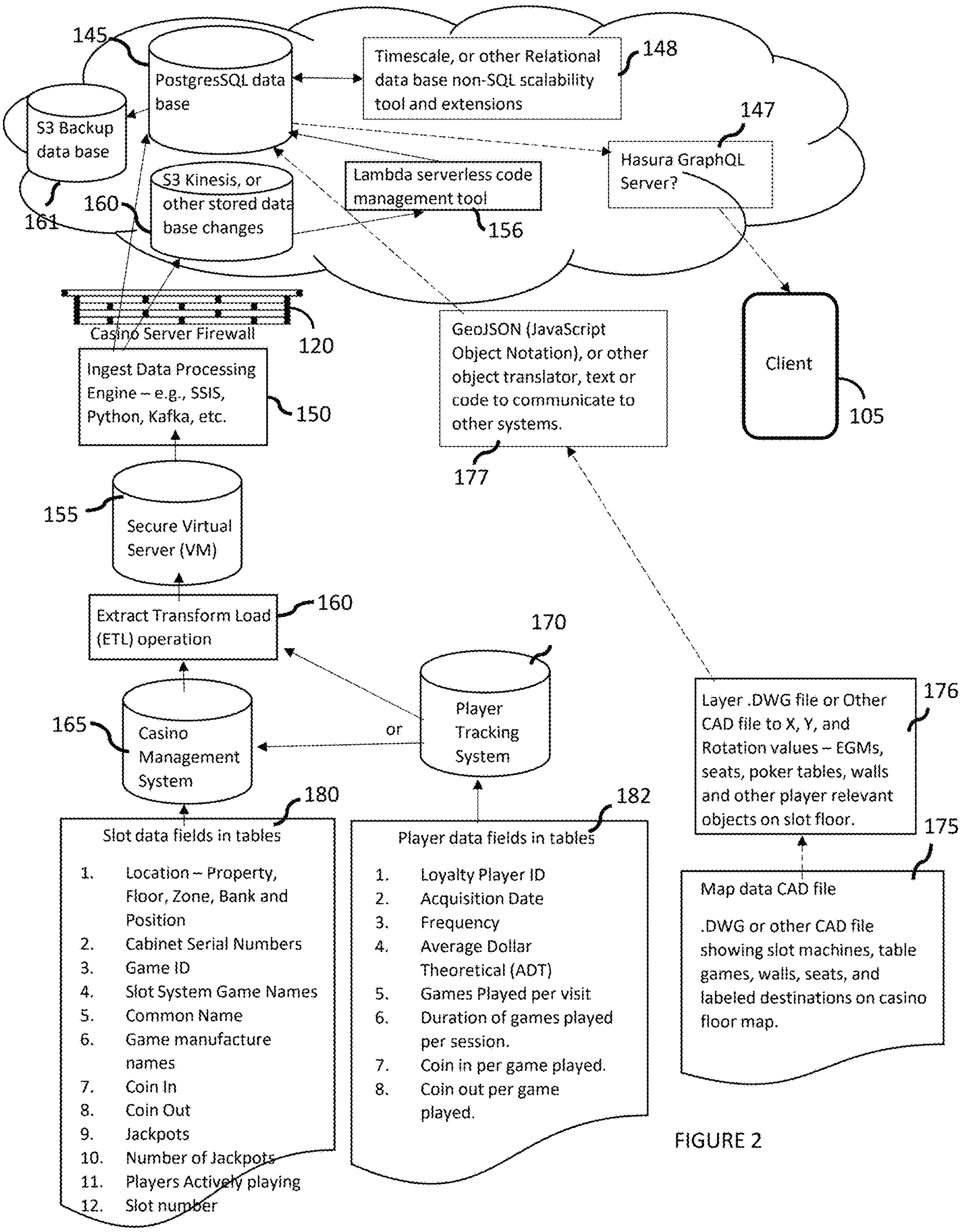
FIG. 2 shows a detailed view of the casino property system communicatively coupled to the cloud based system for hot slots player engagement and decision making.

Referring to FIG. 2 there is shown a detailed view of the casino property system communicatively coupled to the cloud based system for hot slots player engagement and decision making. The casino property system includes the casino management system 165, which receives and collects a plurality of EGM data fields 180 from a plurality of gaming machines (not shown). In some embodiments, the EGM data is received by tables according to the type of data received. In other embodiments, the received EGM data is received and then organized into tables according to the type of data received. The EGM data may include the data types: location, cabinet serial numbers (gaming device ID), game ID, slot system game names, common name, game manufacture names, coin-in (i.e., money played), coin-out (i.e., money won), jackpots winnings, number of jackpots, actively playing players, slot number. The location data type may further include a property, a floor, a zone, a bank, and/or a position. Further, the data received for each data type may include one or more data values and an associated time for each value.

In the illustrative embodiment, the casino property system includes a player tracking system 170 in addition to the casino management system 165. The player tracking system 170 receives and collects a plurality of player data fields 182 from the plurality of EGMs. In some embodiments, the player data 182 is received by tables according to the type of data received. In other embodiments, the received player data 182 is received and then organized into tables according to the type of data received. The player data 182 may include the data types: loyalty player ID, acquisition date, frequency, average dollar theoretical (ADT), games played per visit, duration of games played per session, coin-in per game played, coin-out per game played. Further, the data received for each data type may include one or more data values and an associated time for each value. In a further embodiment, the player data 182 is received and collected by the casino management system 165 and the functions of the player tracking system 170 are performed by the casino management system 165.

An Extract, Transform, Load (ETL) operation 160 copies the EGM data 180 and the player data 182 from the casino management system 165 and/or the player tracking system 182 into a compatible format for transmission to a secure virtual server (e.g., a virtual machine (VM)) 155. In some embodiments, the transformed EGM data 180 and player data 182 is further processed with an ingest data processing engine 150 that may use SSIS, Python, Kafka, or a suitable low latency, high volume processing operation. In other embodiments, the data is copied and/or further processed by a suite of applications and micro-services that enable different servers, data bases and data tables to talk to each other in a secure and reliable manner and with upload and download speeds that prevent noticeable lag when the user enjoys the various features on the mobile application. Collectively, the ETL operation 160 and the ingest data processing engine 150 are referred to as back-end services, because these terms refer to technology that achieves operational excellence behind the scenes of what the player or user experiences.

The transformed and/or further processed EGM data 180 and player data 182 are transmitted across a casino server firewall to the cloud based system. In one embodiment, the transformed and/or further processed EGM data 180 and player data 182 is transmitted across the casino server firewall directly to a PostgresSQL database 145 or similar relational database. In other embodiments, the transformed and/or further processed EGM data 180 and player data 182 is transmitted across the casino server firewall to an S3 Kinesis database 160 or similar cloud database where Lambda 156, or another event-driven, serverless code management tool processes and/or reformats the data prior to transmission to the PostgresSQL database 145. In other embodiments, the data is processed by a suite of applications and micro-services that enable different servers, data bases and data tables to talk to each other in a secure and reliable manner and with upload and download speeds that prevent noticeable lag when the user enjoys the various features on the mobile application. A copy of the data received by the PostgresSQL database 145 is transferred to an S3 backup database 161, which is also resident in the cloud based system.

Additionally, received by the PostgresSQL database 145 is processed and/or layered slot floor design data. The slot floor design data may originate as map data or a CAD file (i.e., .DWG or other CAD-type file) 175 that shows the location and orientation in two or three dimensions of slot machines, table games, walls, seats, and labeled destinations on a casino's floor map. The labeled destinations may be restaurants, shops, and other attractions. The original slot design data 175 may then be layered 176 to x, y, and rotation values for the elements of the casino floor map, e.g., the slot machines, table games, walls, seats, and labeled destinations. The EGMs are added as polygons to a second layer of the map. The first layer, the background, consists of 'map tiles'. These tiles typically convey roads, topography, or satellite imagery, but we can use blank tiles for a background of whatever solid color we prefer. A third map layer will be added to display the names of each EGM when the user reaches a sufficient zoom level. In some embodiments, the processed and/or layered slot floor design data 177 is translated by GeoJSON, another object translator, or a text/code used to communicate to other systems.

The cloud based system formats the transformed and/or further processed EGM data 180 and player data 182, as well as the processed and/or layered slot floor design data with a Hasura graphQL engine 147 or similar graphQL engine prior to transmission to a client device or API resident on the client device. In other embodiments, the data is processed and/or layered by a suite of applications and micro-services that enable different servers, data bases and data tables to talk to each other in a secure and reliable manner and with upload and download speeds that prevent noticeable lag when the user enjoys the various features on the mobile application.

Figure 3:
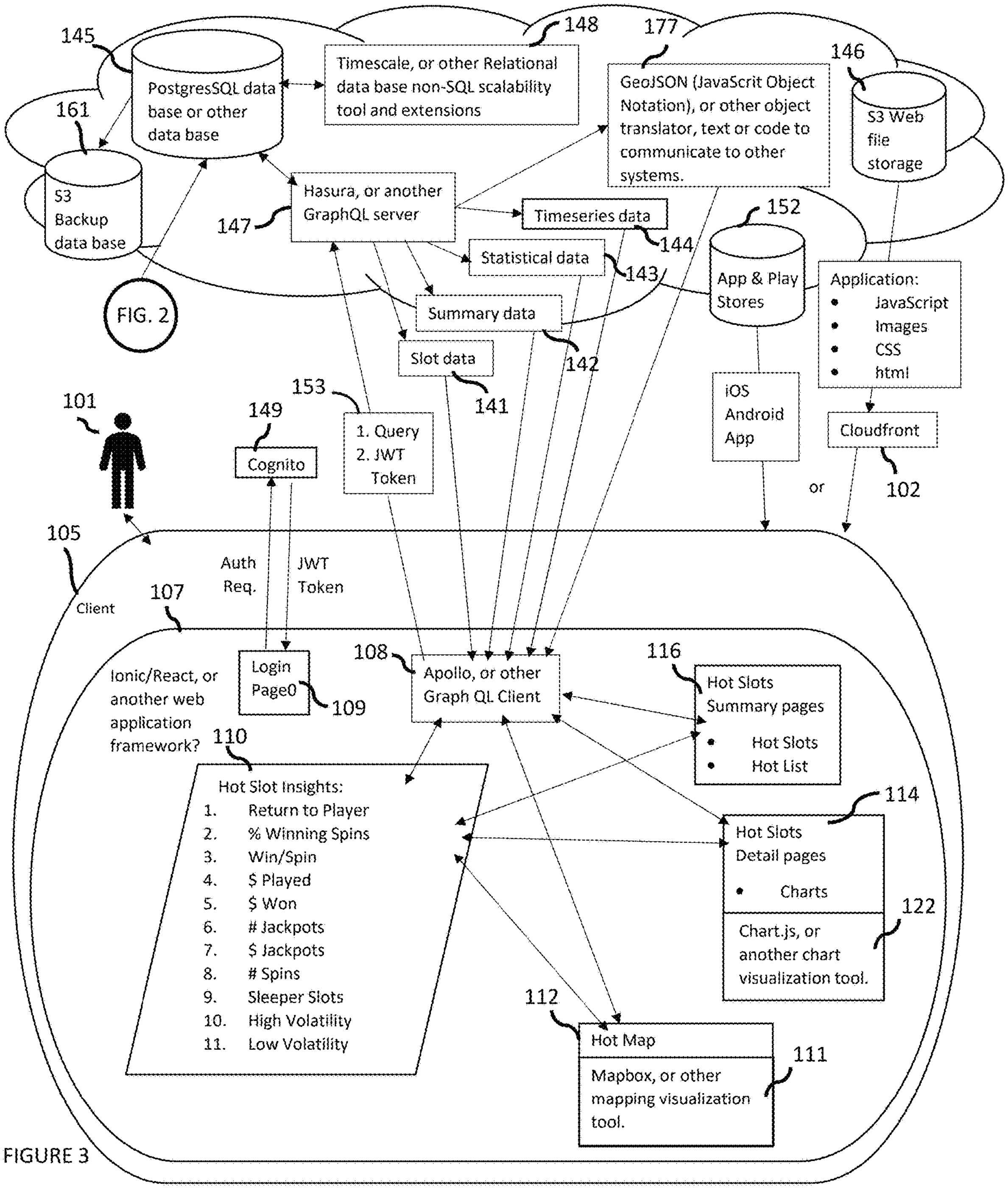
FIG. 3 shows a detailed view of the cloud based system communicatively coupled to a client device.

Referring to FIG. 3 there is shown a detailed view of the cloud based system communicatively coupled to a client device. By way of example and not of limitation, the cloud based system includes at least one of the PostgresSQL database 145, the S3 backup database 161, an S3 web file storage location 146, and an app store 152. The client device 105 is associated with a client or player 101 and includes a display that presents an application 107 computationally supported by the cloud based system or network appliance.

The illustrative PostgresSQL database 145 is resident on an illustrative cloud based network appliance, e.g., a server, and receives EGM data 180, player data 182, and map data 175, which it backs up by storing copies of the data in the S3 backup database 161. A Hasura graphQL engine 147 processes the various data received by the PostgresSQL database 145 for transmission from the network appliance to the application 107 presented by the client device display. In other embodiments, the data is processed by a suite of applications and micro-services that enable different servers, data bases and data tables to talk to each other in a secure and reliable manner and with upload and download speeds that prevent noticeable lag when the user enjoys the various features on the mobile application. In alternative embodiments, the PostgresSQL database 145 may be any equivalent relational database, and the Hasura graphQL engine 147 may be any equivalent graphQL engine. The operations of the Hasura graphQL engine 147, may commonly be referred to as front-end services, because the Hasura graphQL engine 147 is technology that provides what the player or user experiences on the front end while operating the application 107 on a client device 105.

The S3 web file storage location 146 enables content delivery to the client device 105 through a network of data centers within the cloud or cloud based system that are edge locations. The S3 web file storage location 146 serves content requested by the client device 105 by routing that content to the edge location that provides the lowest latency or time delay, which improves overall performance and feel of the client device 105 and the application 107 presented thereon. In some embodiments, the content requested is the application 107 for download and installment on the client device 105. The application 107 prior to installment may include one or more data packets, batches, and/or files, and more particularly Javascript, image files, CSS, and html code. In one illustrative embodiment, the S3 web file storage location 146 is the Amazon CloudFront 102 content delivery network, which provides scalability by locating particular data in a geographically appropriate network appliance.

The app store 152 may be the Apple App Store (IOS app store), an Android app store (i.e., the Google Play Store, a manufacturer app store, a third-party app store, or a proxy app store), or any combination thereof. The manufacturer app stores include Samsung Galaxy Store, the Amazon Appstore, Huawei AppGallery, Xiaomi Mi GetApps, OPPO App Market, VIVO App Store, or any combination thereof. The third-party app store includes the Amazon Appstore, Aptoide, XDA Labs, F-Driod, GetJar, Itch.io, Uptodown, or any combination thereof. The proxy app store may include the Aurora Store, the Yalp Store, or any combination thereof.

The Hasura graphQL engine 147 performs several formatting actions that organize the EGM data 180, player data 182, and map data 175 according to several metrics for delivery to, and consumption by, a graphQL client 108 operating within the application 107 on the client device 105. In the illustrative embodiment, the Hasura graphQL engine 147 converts SQL data architectures to non-SQL data architectures, which scale better as the amount of data traveling through the system increases. The Hasura graphQL engine 147 formats the map data 175 into a GeoJSON object notation for receipt by the graphQL client 108. In other embodiments, the Hasura graphQL engine 147 may instead format the map data 175 according to another object translator, into a text or code capable of communicating with particular systems. The Hasura graphQL engine 147 may also format and organize the EGM data 180 and player data 182 according to time series data 144, statistical data 143, summary data 142, and slot-focused data 141. The time series data 144, statistical data 143, summary data 142, and slot-focused data 141 may be within, inherent to, or be a distinct element of one or more of the EGM data 180 and player data 182, metadata, or any combination thereof. While the slot-focused data is not the EGM data 180, it may be a part thereof, derived from player data 182 pertaining to player interactions with one or more gaming machines, or any combination thereof.

Secure communications may be enabled by the Hasura graphQL engine 147 using JSON Web Tokens (JWTs) exchanged in response to one or more certain queries 153, such as requests for JWTs. The received JWT allows for later credential authorization with a service, such as Cognito 149. Cognito 149 is a custom authorizer that organizes users into one or more user pool to control access to the application 107 in the network appliance 145.

The client device 105 includes a processor and memory (not shown) on which an application 107 operates to present curated data pertaining to gaming machine performance and player game play history on the client device 105 display (not shown), which allow players to plan a gaming experience. In various embodiments, the client device 105 includes, but is not limited to, a desktop, laptop, tablet, phablet, smart phone, and mobile phone.

The application 107 presents an assortment of historical insights, i.e., player selectable variables, for EGMs in a format that allows players or users to select a category in which to compare the performance of one or more gaming machines, and from such comparison determine the identity and location of one or more gaming machines. The application 107 may be a mobile application, API, a web application, a progressive web application, or any combination thereof. As used herein, a web application may utilize one or more software frameworks and one or more database systems.

In some embodiments, the mobile application is provided to a mobile digital processing device at the time it is manufactured. In other embodiments, the mobile application is provided to client device(s) 105 from the network appliance computer network 145. In some embodiments, a computer program includes a standalone application, which is a program that is run as an independent computer process, not an add-on to an existing process, e.g., not a plug-in. Those of skill in the art will recognize that mobile applications are written in any one or more of several coding languages.

The application 107 is accessed through a login initialization page 109 using Cognito 149 to authorize the application and user. In operation, the login page 109 submits an authorization request to a server or cloud hosting the Cognito service in response to a user input received at the client device 105. Upon acceptance of the JWT token, the application 107 presents the user a selected "view" of certain performance indicator(s) for one or more gaming machines.

A "view" may include a graphically relevant representation of the information and/or performance indicators a player 101 selects. These selections may arise from a player's desire to see certain comparators in order to influence and/or guide the player's decision making process as to which EGM(s) to play. Views may be selected according to one or more particular metric for comparison of gaming machines, which collectively are termed "hot slot insights" 110, i.e., player selectable variable(s). By way of example and not of limitation, these comparative insights 110 include return to player, % winning spins, win per spin, $ played, $ won, #jackpots, $ jackpots, #spins, sleeper slots, high volatility, and low volatility.

Each insight, i.e., player selectable variable, 110 has an associated value for each gaming machine from a pool of related gaming machines. Thus, an insight value is a value for any one particular hot slot insight that corresponds to a particular gaming machine. Further, these insight values are calculated for a certain or selected pool of EGMs during a certain or selected period of time or timeframe. The pool of gaming machines may be all EGMs of a particular type, all gaming machines on one or more casino floors, all gaming machines on a casino property, all gaming machines in a group of casinos, or any combination thereof.

The timeframe may be a player selectable time range including the previous hour, day, week, month, year to date, all visits. These player selectable time ranges may also include event specific timeframes, such as: since a player's last visit to one or more casinos, or since the last jackpot was awarded on a gaming machine within the applicable pool of gaming machines. For the player selectable time range "since last visit," the insight value(s), i.e., player selectable variable, and comparative rankings are determined for a time range spanning from the present back to the last time the player selecting the time range previously recorded an action at an applicable casino.

For the player selectable time range "since last jackpot," the insight value(s) and comparative rankings are determined for a time range spanning from the present back to the last time a jackpot occurred on a gaming device in an applicable casino, casino floor, or type of gaming machine. Examples include: (1) $ played since last jackpot, i.e., the total amount of money wagered (i.e., played) by all players since the most recent or last Jackpot occurred; (2) $ won since last jackpot, i.e., the total amount of money won or paid out to all players since the most recent or last jackpot occurred; and (3) spins since last jackpot, i.e., the total number of spins (i.e., game sessions) since the most recent or last Jackpot occurred.

The return to player insight, also termed simply "return," is the percent value of total money won or returned to players divided by the total money played (i.e., lost) by players during a certain selected timeframe. This would be calculated as "Return=100*(money paid out/money wagered)".

The percent (%) of winning spins insight refers to the percent of spins (i.e., game sessions) that won (i.e., return) money or a monetary award to players during a certain selected timeframe. This insight value is calculated as "% Winning Spins=100*(game sessions awarding money to players/total game sessions)".

The win per spin insight is also termed "average money won per spin," which is the average amount of money won per individual spin (i.e., game session) during a certain selected timeframe. Win per spin is calculated as "Win/Spin=total money awarded/total spins".

The money ($) played insight refers the total amount of money played or wagered by all players during a certain selected timeframe.

The money ($) won insight is the total amount of money won or paid out to players during a certain selected timeframe.

The number (#) jackpots insight refers to the total number of Jackpots awarded during a certain selected timeframe.

The jackpot money (i.e., "$ jackpots") insight is the total amount of money won or awarded from jackpots during a certain selected timeframe. This may be a measure of jackpot payouts to players.

The number (#) spins insight is the total number of spins or game sessions during a certain selected timeframe.

The sleeper slots insight refers to EGMs having a relatively high return to player and a relatively low total number of spins during a certain selected timeframe. The selection criteria required to qualify as a relatively high return to player may be set as a certain number of standard deviations (e.g., +3) above the average for all gaming machines of a particular type of machine, on one or more casino floors, on a casino property, in a group of casinos. The selection criteria required to qualify as a relatively low total number of spins may be set as a certain number of standard deviations (e.g., −3) below the average for all gaming machines of a particular type of machine, on one or more casino floors, on a casino property, in a group of casinos.

The volatility insight generally refers to the variance or dispersion of payouts on gaming machine(s) and is a measure of the risk involved in playing a particular game. Existing expressions of volatility are binary, i.e. a gaming machines has either high volatility or low volatility. Higher volatility equates to higher risk and is exemplified by larger payouts that are fewer and farther between. Lower volatility equates to lower risk and is exemplified by smaller payouts that are a lot more frequent. Unlike the binary utility of high and low volatility generally, the high volatility insight value and low volatility insight value provide a scaled quantitative measure of the volatility of one or more gaming machines compared to all gaming machines of an applicable pool of gaming machines.

With respect to the high volatility insight value, high volatility gaming machines are those that have demonstrated a high percent (%) return to player compared to other gaming machines (i.e., of a particular type of machine, on one or more casino floors, on a casino property, in a group of casinos) and a low percent (%) of winning spins compared to those other gaming machines. The percent (%) return to player is calculated as "% return=100*(coin-out/coin-in)" and the percent (%) of winning spins is calculated as "% winning spins=100*(winning spins/total spins)". In one embodiment, the high volatility insight value is calculated as a ratio of the percent return to player divided by the percent of winning spins ("High Volatility=% return/% winning spins").

With respect to the low volatility insight value, low volatility EGMs are those that have demonstrated a high percent (%) of winning spins compared to other gaming machines (i.e., of a particular type of machine, on one or more casino floors, on a casino property, in a group of casinos) and a low percent (%) return to player compared to those other gaming machines.

Each of the plurality of insight values, i.e., player selectable variable, are updated in real-time from the network appliance 145 based on EGM data 180 and player data 182 received from the casino management system 165.

The various, or a particular selected, hot slot insights 110 are displayed on the client device 105 through one or more of the view page types: hot map 112, hot slots details 114, and hot slots summary 116. The hot map 112 view type presents a casino floor plan map indicating gaming machine positions on the casino floor, gaming machine status, and color codes for the gaming machines according to a hot slot color key. The hot slots details 114 view type presents a chart or graph for a hot slot insight 110 during a selected timeframe. The hot slots summary 116 view type presents a list of the top ranked gaming machine(s) for one or more hot slot insight 110 for a selected timeframe.

The hot map 112 view type is configured to support 3D height extrusion on polygons out-of-the-box. In one embodiment, Leaflet operates as a viewer supporting the hot map 112 view type presentation. In another embodiment, the hot map 112 view type is facilitated with an open-source resource, such as maplibre-gl-js. In a further embodiment, the hot map 112 view type is facilitated with a licensed resource, such as Mapbox. Mapbox can consume GeoJSON versions of the casino floor plans, so that the EGMs are positioned in one or more views at their real-life geo-coordinates and sizes in a virtual world map. However, the views are configured such that a user cannot pan or scroll beyond the boundaries of the casino, nor zoom out to such an extent that areas beyond the casino are visible.

Mabox maps can be updated in real time, allowing for the continual setting of an appropriate 'heat' property and 'occupied' property for individual slot machines depicted on any view of the hot map 112 view type. In these embodiments, the 'occupied' property corresponds to a binary symbol system representing whether a gaming machine is being actively played (i.e., occupied) or not actively played (i.e., unoccupied). In these embodiments, the 'heat' property corresponds to a given color representing a range of values for any selected insight. The definition of a color by its association to a 'heat' property is provided centrally through a cloud authority and shared across all casino maps provided by the application 107.

In one embodiment, Mapbox is rendered in HTML5 canvas and features smooth panning and zooming interactions. Mapbox also provides the capability of detecting touch events, such as receiving a user input instruction that can trigger a selection or feature of the application, e.g., the user taps on a specific EGM represented on a map view. In a further embodiment, a map view may display multiple casinos in geographically accurate locations and route directions to travel to any one or more of the displayed casinos.

In an illustrative embodiment, values for a particular insight for each of a plurality of gaming machines are ranked by the computing power offered on the network appliance 145 and displayed through the application on the client device 105. Thus, when a player selects a particular insight, i.e. player selectable variable, the cloud server 145 (or more generally the network appliance) filters the EGM data 180 and player data 182 to generate ranked lists or maps for the selected insight. These insight values may be subdivided into six tiered subsets.

In the illustrative embodiment, the highest ranked subset of EGMs for a particular insight is presented in red on a heat map view and comprises the top 16% (i.e., 84th percentile and up; ranging from +1 standard deviations above the mean value for a particular insight and up) of EGMs ranked most "hot" for the selected insight attribute. This ranking is relative and based upon comparison to the performance EGM data for all other gaming machines within an applicable group (i.e., EGM type, class II games, class III games, bingo, games of chance based off bingo, non-banked card games, slot machines, video card game machines, video poker machines, device brand, game name, floor, associated property, etc.), which may be player selectable through the application 107 as a user interface for the client device 105.

The term "hot" refers to a EGM state, which is determined by analyzing a player selectable data set. The player selectable data set, i.e., hot slot insights, is associated with at least one player selectable variable identified by a CMS 165, a player tracking system 170, or any combination thereof. A player selectable time range is used to filter the player selectable data set. The filtered data set is then analyzed using a data analytical tool (i.e., a network appliance component and/or module). The result of the data analysis is presented to the user for planning and/or selection of an EGM for immediate or future play. By way of example and not of limitation, the "hot slot insights" data analytical tool analyzes the player selectable data set using a stochastic statistical model, which relies on a historical data set. In the illustrative embodiment, a standard deviation is used to identify the "hot" EGM using the hot slot color key. The "player selected variable" may also be referred to interchangeably as an "insight."

In the illustrative embodiment, a second highest ranked subset of EGMs for a particular insight is presented in orange on a heat map view and comprises the top 16%-33% (i.e., 67th percentile through 84th percentile; ranging from +0.5 standard deviations above the mean value for a particular insight to +1 standard deviations above the mean) of EGMs ranked most hot for the selected insight attribute.

A third highest ranked subset of EGMs for a particular insight is presented in yellow on a heat map view and comprises the top 34%-50% (i.e., 66th percentile through 50th percentile; ranging from the mean value for a particular insight to +0.5 standard deviations above the mean) of EGMs ranked most hot for the selected insight attribute.

A fourth highest ranked subset of EGMs for a particular insight is presented in green on a heat map view and comprises the top 50%-67% (i.e., 50th percentile through 34th percentile; ranging from −0.5 standard deviations below the mean value for a particular insight to the mean) of EGMs ranked most hot for the selected insight attribute.

A fifth highest ranked subset of EGMs for a particular insight is presented in light blue on a heat map view and comprises the top 67%-84% (i.e., 33rd percentile through 16th percentile; ranging from −1 standard deviations below the mean value for a particular insight to −0.5 standard deviations below the mean) of EGMs ranked most hot for the selected insight attribute.

Lastly, a sixth highest ranked subset of EGMs for a particular insight is presented in orange on a heat map view and comprises the top 84% (i.e., the bottom 16% or the 16th percentile and below; ranging below −1 standard deviations below the mean value for a particular insight) of EGMs ranked most hot for the selected insight attribute. This last subset tier is also referred to as "Not Hot".

These colored heat map views allow users to assess a plurality of EGMs with a visual graphic that players can use to both determine which EGM they want to play based on one or more insight values and navigate to that EGM using the position of the EGM presented in the map view.

The hot slots details 114 provides views of graphical historical slot performance analysis for one or more insights 110. The graphic visualizations may be charts of an insight 110, such as a bar chart. In the illustrative embodiment, chart.js is the visualization tool 122 implemented to integrate the insights into a map view on the client device 105. In alternative embodiments, another visualization tool 122 is implemented for this purpose. Chart views enable players to track the performance of a particular machine before prior to and after completing play. Enabling tracking in between a player's visits to a particular casino or gaming device shows a player how they played in their previous visits. Enabling tracking after a player has completed play on a machine allows players track whether another player has won from "their" machine, taking "their money".

The hot slots summary 116 may present views of "hot slots," or "hot list." The hot slots view presents one or more top ranked EGMs for each of a plurality of insights. The hot list provides a narrower more detailed view of one or more of the highest ranked EGMs for a particular insight.

Figure 4:
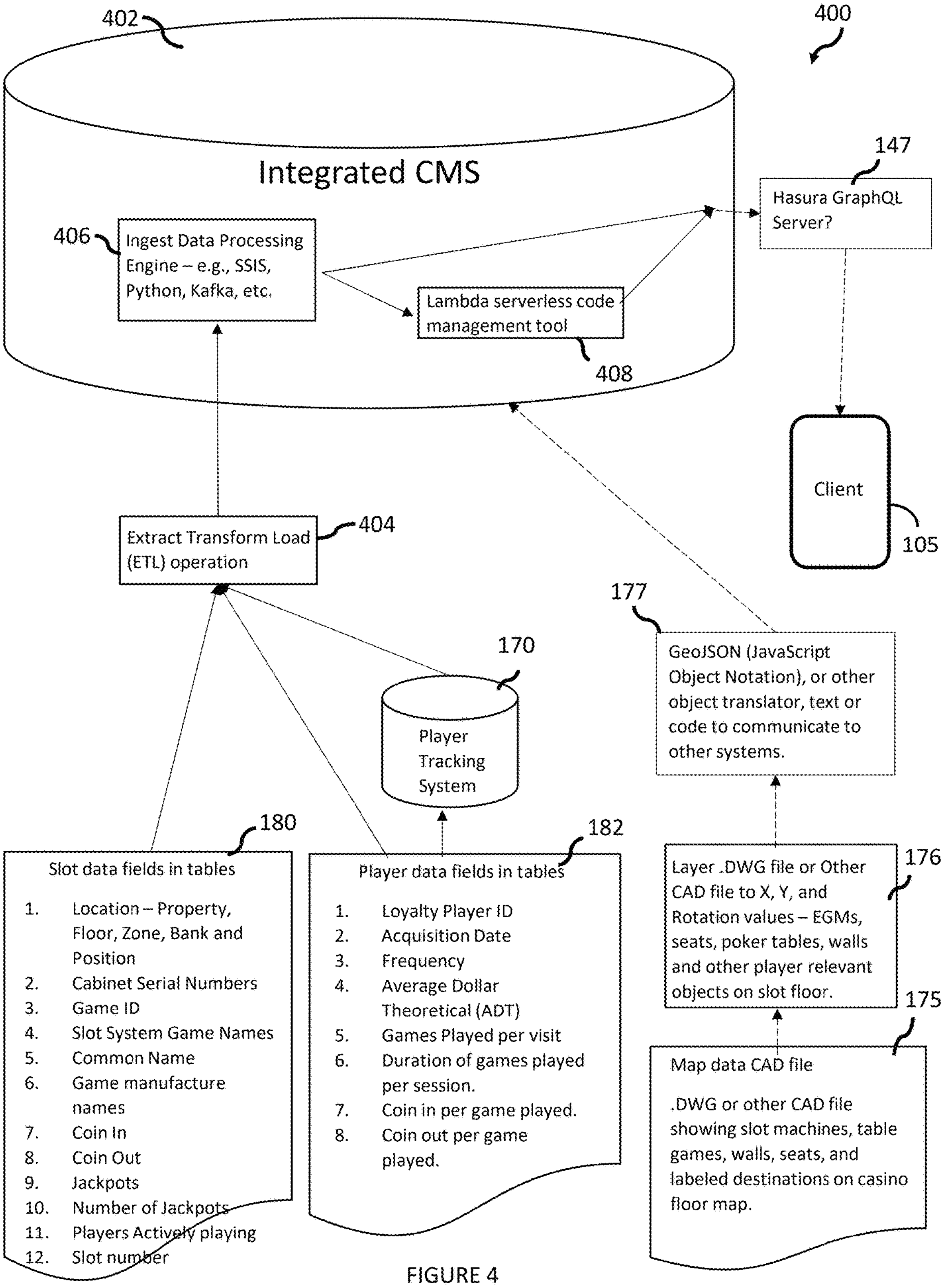
FIG. 4 shows an alternative architecture for a casino patron engagement system for hot slots player engagement and decision making.

Referring now to FIG. 4, there is shown an alternative embodiment 400 where an integrated casino management system 402 performs the functions and operations of the previously described CMS 165 and network appliance (embodied as the cloud-side system, cloud server 145, or any combination thereof). This results in the access and utilization of only a single database, which database is associated with the integrated CMS 402.

The alternative embodiment 400 includes only a casino-side system and a client device 105. The integrated CMS 402 receives and collects a plurality of EGM data fields 180 from a plurality of gaming machines (not shown). In some embodiments, the EGM data is received by tables according to the type of data received. In other embodiments, the received EGM data 180 is received and then organized into tables according to the type of data received. The EGM data 180 may include the data types: location, cabinet serial numbers (gaming device ID), game ID, slot system game names, common name, game manufacture names, coin-in (i.e., money played), coin-out (i.e., money won), jackpots winnings, number of jackpots, actively playing players, slot number. The location data type may further include a property, a floor, a zone, a bank, and/or a position. Further, the data received for each data type may include one or more data values and an associated time for each value.

In the alternative embodiment 400, the casino-side system may include a player tracking system 170 in addition to the integrated CMS 402. The player tracking system 170 receives and collects a plurality of player data fields 182 from the plurality of EGMs. In some embodiments, the player data 182 is received by tables according to the type of data received. In other embodiments, the received player data 182 is received and then organized into tables according to the type of data received. The player data 182 may include the data types: loyalty player ID, acquisition date, frequency, average dollar theoretical (ADT), games played per visit, duration of games played per session, coin-in per game played, coin-out per game played. Further, the data received for each data type may include one or more data values and an associated time for each value. In a further embodiment, the player data 182 is received and collected by the integrated CMS 402 and the functions of the player tracking system 170 are performed by the integrated CMS.

In this alternative embodiment, an ETL operation 404 copies the EGM data 180 and the player data 182 into a compatible format for transmission to one or more components/modules within the integrated CMS 402. In some embodiments, the EGM data 180 and player data 182 is further processed with an ingest data processing engine 406 that may use SSIS, Python, Kafka, or a suitable low latency, high volume processing operation. In other embodiments, the data is copied and/or further processed by a suite of applications and micro-services that enable different servers, data bases and data tables to talk to each other in a secure and reliable manner and with upload and download speeds that prevent noticeable lag when the user enjoys the various features on the mobile application.

In some embodiments, the EGM data 180 and player data 182 is processed with a Lambda serverless code management tool 408 or similar event-driven code management tool. The Lambda serverless code management tool 408 reformats the data further to improve data handling and management.

The integrated CMS 402 also receives slot floor design data originating as map data or a CAD file (i.e., .DWG or other CAD-type file) 175 that shows the location and orientation in two or three dimensions of slot machines, table games, walls, seats, and labeled destinations on a casino's floor map. The labeled destinations may be restaurants, shops, and other attractions. The original slot design data 175 may then be layered 176 to x, y, and rotation values for the elements of the casino floor map, e.g., the slot machines, table games, walls, seats, and labeled destinations. The integrated CMS 402 layers the slot floor design data. The first layer, the background, consists of 'map tiles'. These tiles typically convey roads, topography, or satellite imagery, but we can use blank tiles for a background of whatever solid color we prefer. A third map layer will be added to display the names of each EGM when the user reaches a sufficient zoom level. In some embodiments, the processed and/or layered slot floor design data 177 is translated by GeoJSON, another object translator, or a text/code used to communicate to other systems.

The processed EGM data 180 and player data 182, as well as the processed and/or layered slot floor design data are formatted by a Hasura graphQL engine 147 or similar graphQL engine prior to transmission to a client device 105. In other embodiments, the data is processed and/or layered by a suite of applications and micro-services that enable different servers, data bases and data tables to talk to each other in a secure and reliable manner and with upload and download speeds that prevent noticeable lag when the user enjoys the various features on the mobile application. In a still further embodiment, the graphQL engine is resident on the integrated CSM 402.

In this embodiment, the application running on the client device 105 that receives and presents player selectable variables (and/or player selectable variable data sets) for a player selected time range operates using computing resources from the integrated CSM 402 according to a player input instruction selecting one or more certain variables or variable data sets. The computing resources of the integrated CSM 402 operate by generating a filtered player selectable variable data set according to the player selected time range and player selected variable.

Figure 5:
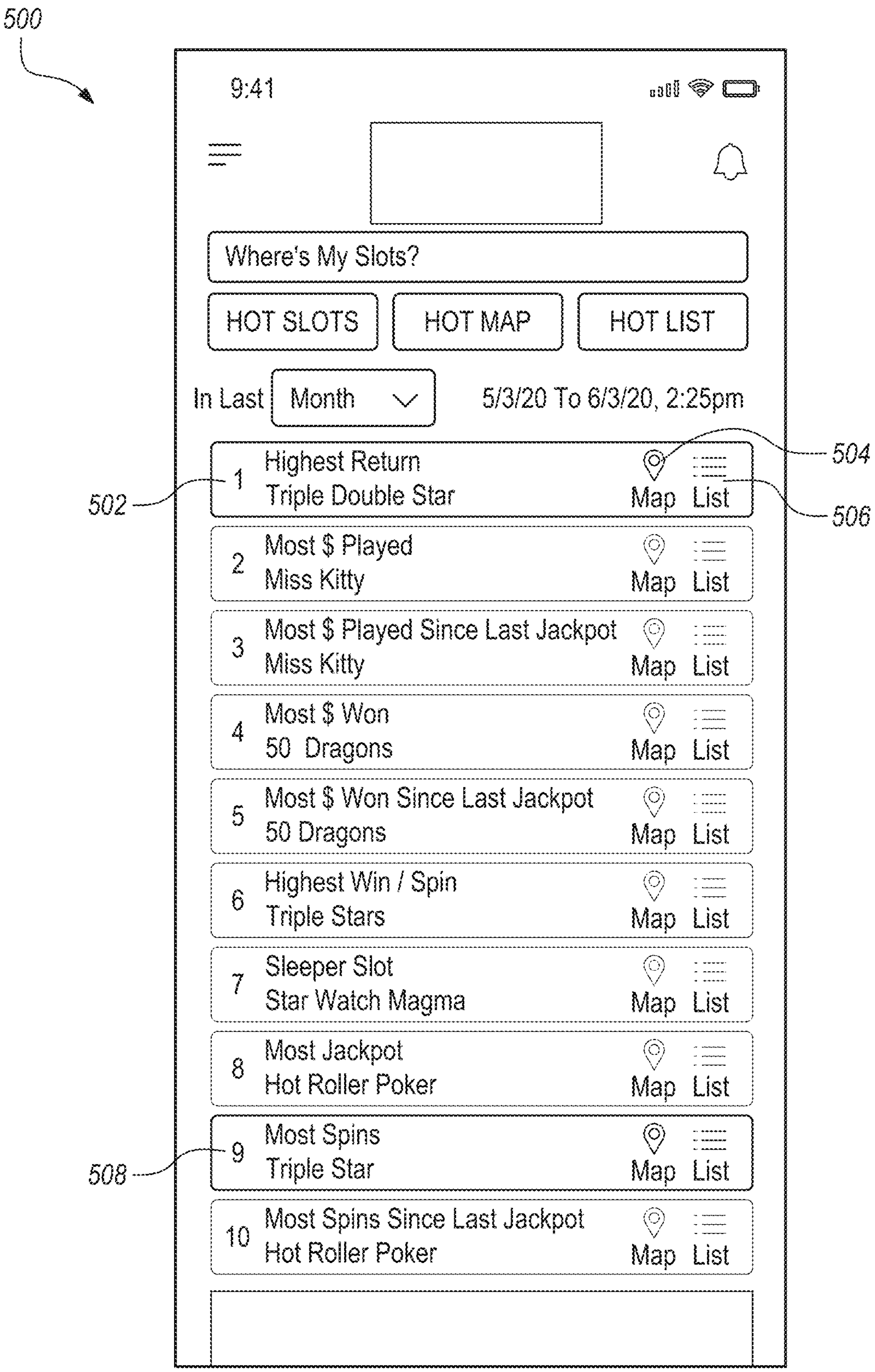
FIG. 5 shows a list of the top ranked EGMs in each of ten (10) player selectable variables, i.e., insights, for EGMs at an illustrative casino property, in which the "highest return" player selected variable is emphasized.

Referring to FIG. 5 there is shown a view of a list 500 of the top ranked EGMs in each of ten (10) insights for EGMs at an illustrative casino property, in which the "highest return" player selected variable is emphasized. The hot slots view 500 shows a list of the top ranked EGMs and each of ten (10) insights for all gaming machines at an illustrative casino property during the previous month. The view shows that the gaming machine with the highest return to player 502 during the previous month was a Triple Double Star machine and indicates that selecting this insight icon will provide the player with location information 504, through a heat map, and a list 506 of the top ranked EGMs according to money returned to player during the previous month. The view additionally shows that the gaming machine with the most spins 508 during the previous month is a Triple Star machine. Notably, more or fewer than ten (10) insights may be displayed in the list on the Hot Slots view 500.

Figure 6:
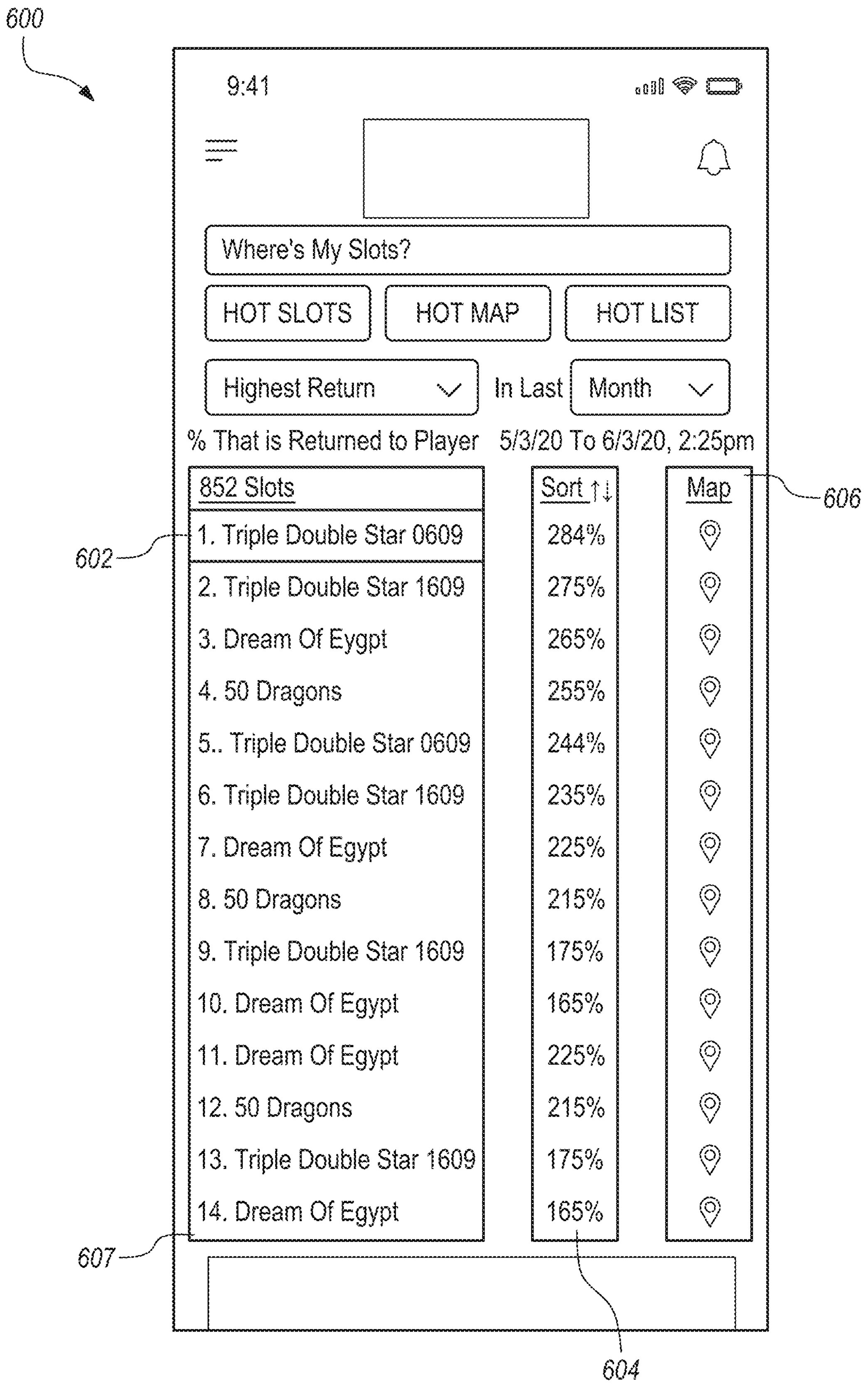
FIG. 6 shows a portrait view of the user interface for the "highest return" player selectable variable shown in FIG. 4.

Referring to FIG. 6 there is shown a portrait view 600 of the user interface for the "highest return" player selectable variable shown in FIG. 5. The illustrative hot list view 600 for EGMs at the illustrative casino property during the previous month is presented as an application running on a client device. This exemplary view 600 may be seen by a player in response to selecting the highest return icon in FIG. 5, such as by inputting a player selection instruction. This view 600 shows a list 607 of EGMS that includes the top ranked EGMs according to highest return insight for the previous month, which includes the Triple Double Star machine #0609 602 as the top ranked EGM out of 852 gaming machines. This portrait view 600 presents a greater number of ranked gaming machines, but fewer metrics (i.e., highest return 604 and map location 606). Note, the term "metric" is different from "insight" because a metric is not selected by a player but is more broadly associated with the particular player selectable variable, i.e., insight.

Figure 7:
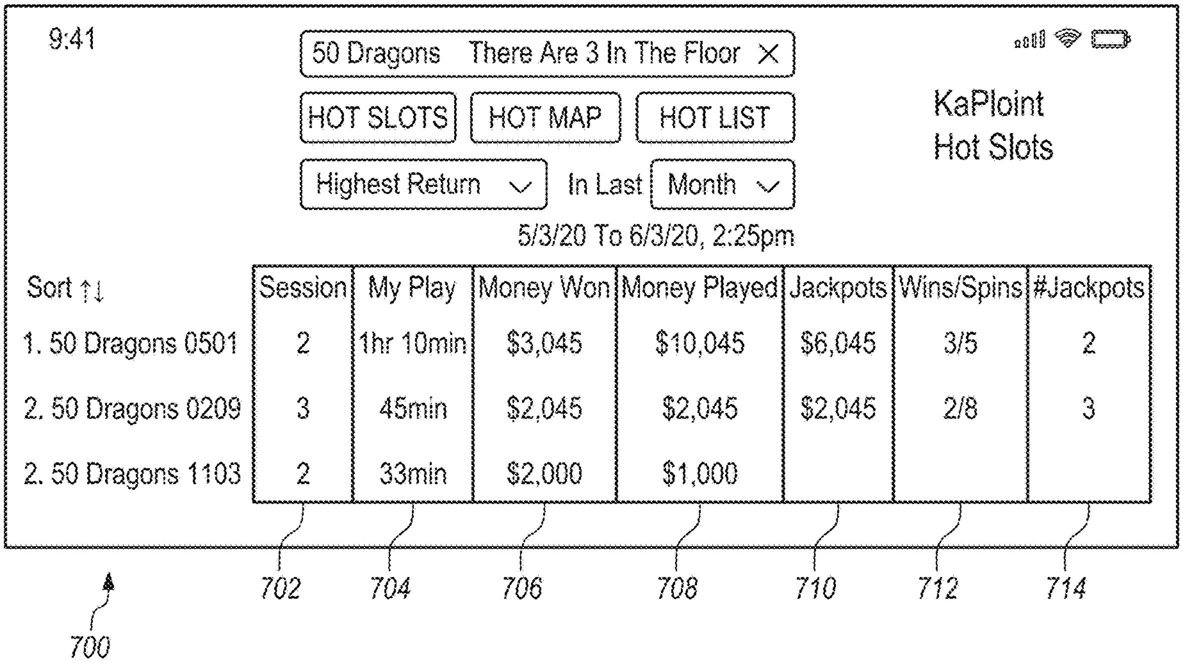
FIG. 7 shows a landscape view of the metrics associated with the "highest return" player selectable variable that includes a session metric, a myplay metric, a money won metric, a money played metric, a jackpots metrics, a wins per spin metric and a number of jackpots metric.

Referring to FIG. 7 there is shown a landscape view 700 of the metrics associated with the "highest return" player selectable variable that includes a session metric 702, a myplay metric 704, a money won metric 706, a money played metric 708, a jackpots metrics 710, a wins per spin metric 712 and a number of jackpots metric 714. The illustrative landscape view 700 presents fewer EGMs than the vertical view but shows more metrics upon which may be further sorted.

Figure 8:
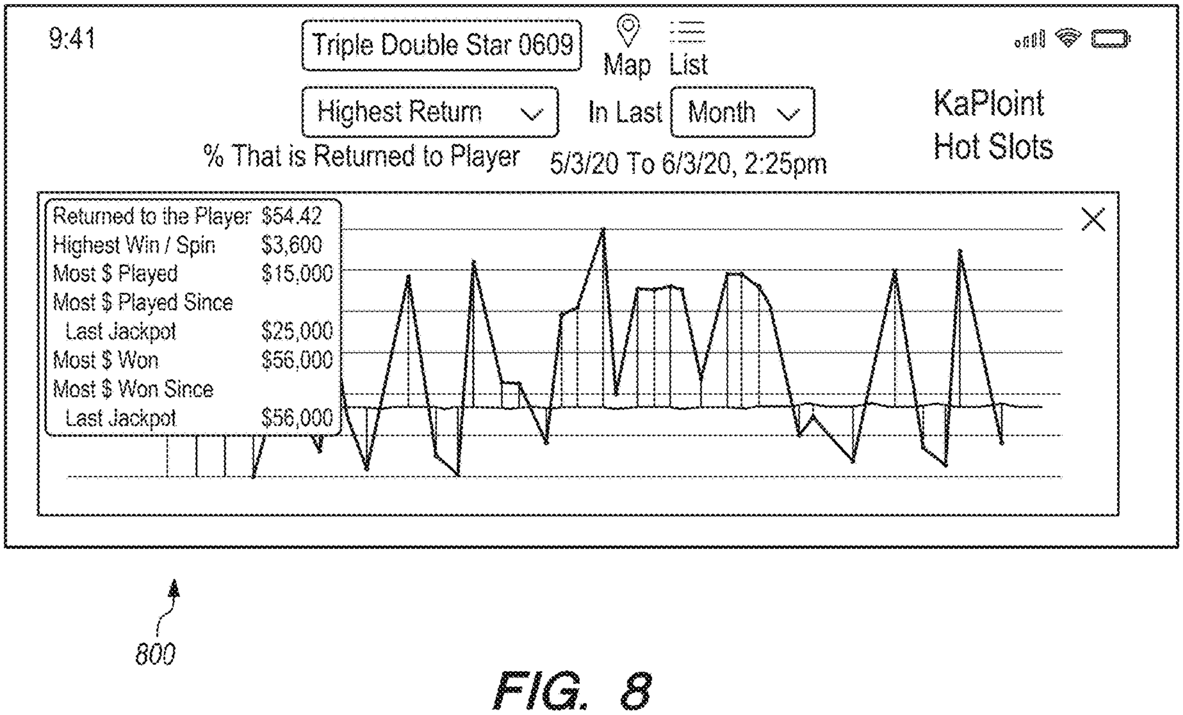
FIG. 8 shows a graphical chart of money returned for a selected EGM.

Referring to FIG. 8 there is shown a graphical chart 800 of money returned for a selected EGM. The graphical chart view of money returned is for only the EGM ranked first according to the highest return insight during the previous month.

Figure 9A:
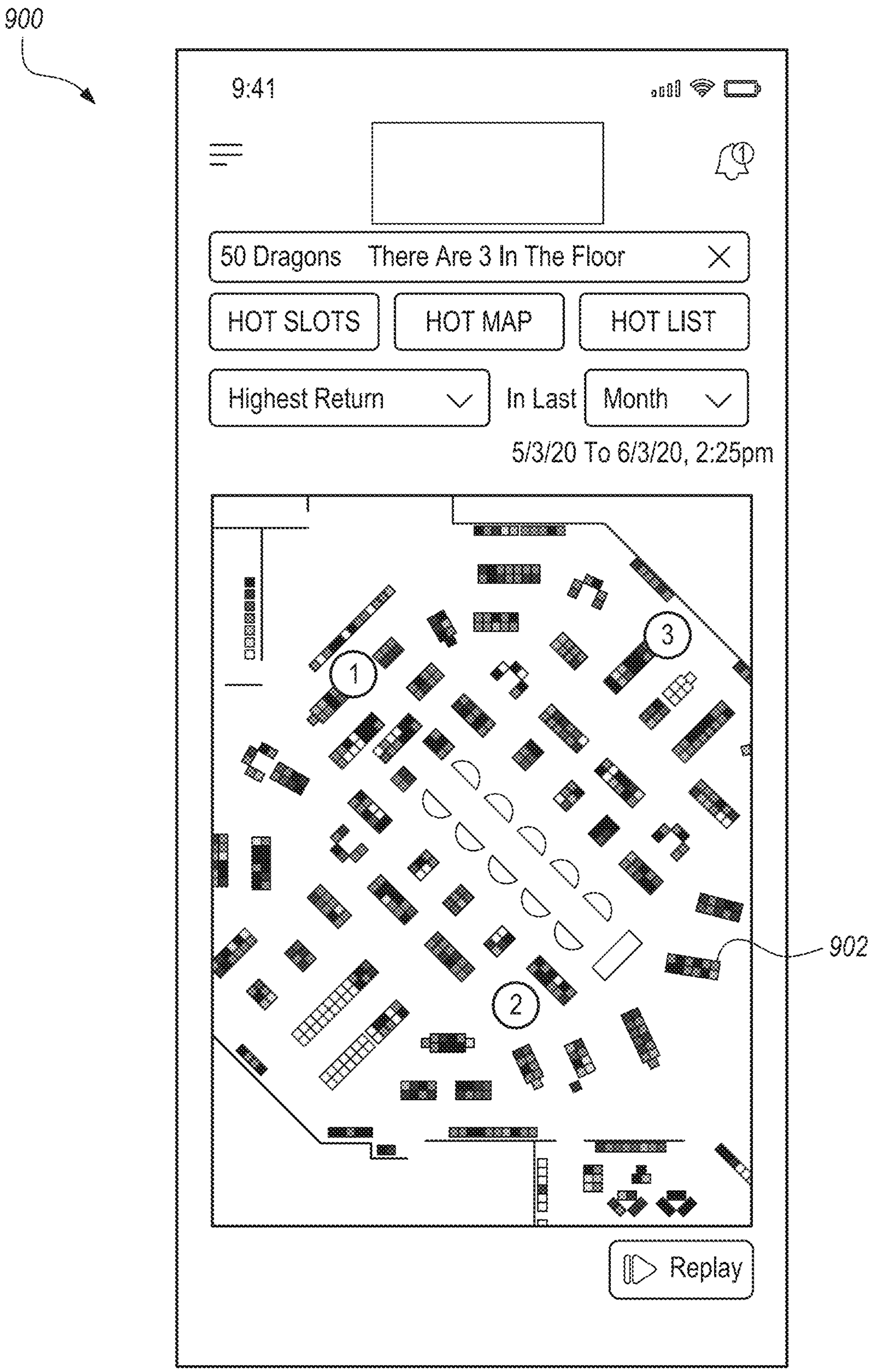
FIG. 9A shows a map view of casino floor map with each EGM on the casino property map rendered with a color corresponding to their relative rank for the "highest return."

Referring to FIG. 9A there is shown a map view of casino floor map 900 with each EGM on the casino property map rendered with a color corresponding to their relative rank for the "highest return." The hot map view of the casino floor map with each EGM 902 on the casino floor is rendered with a color corresponding to their relative rank for the highest return insight during the previous month. This color rendered result is presented within a heat map of EGMs having the highest return to player during the previous month.

Figure 9B:
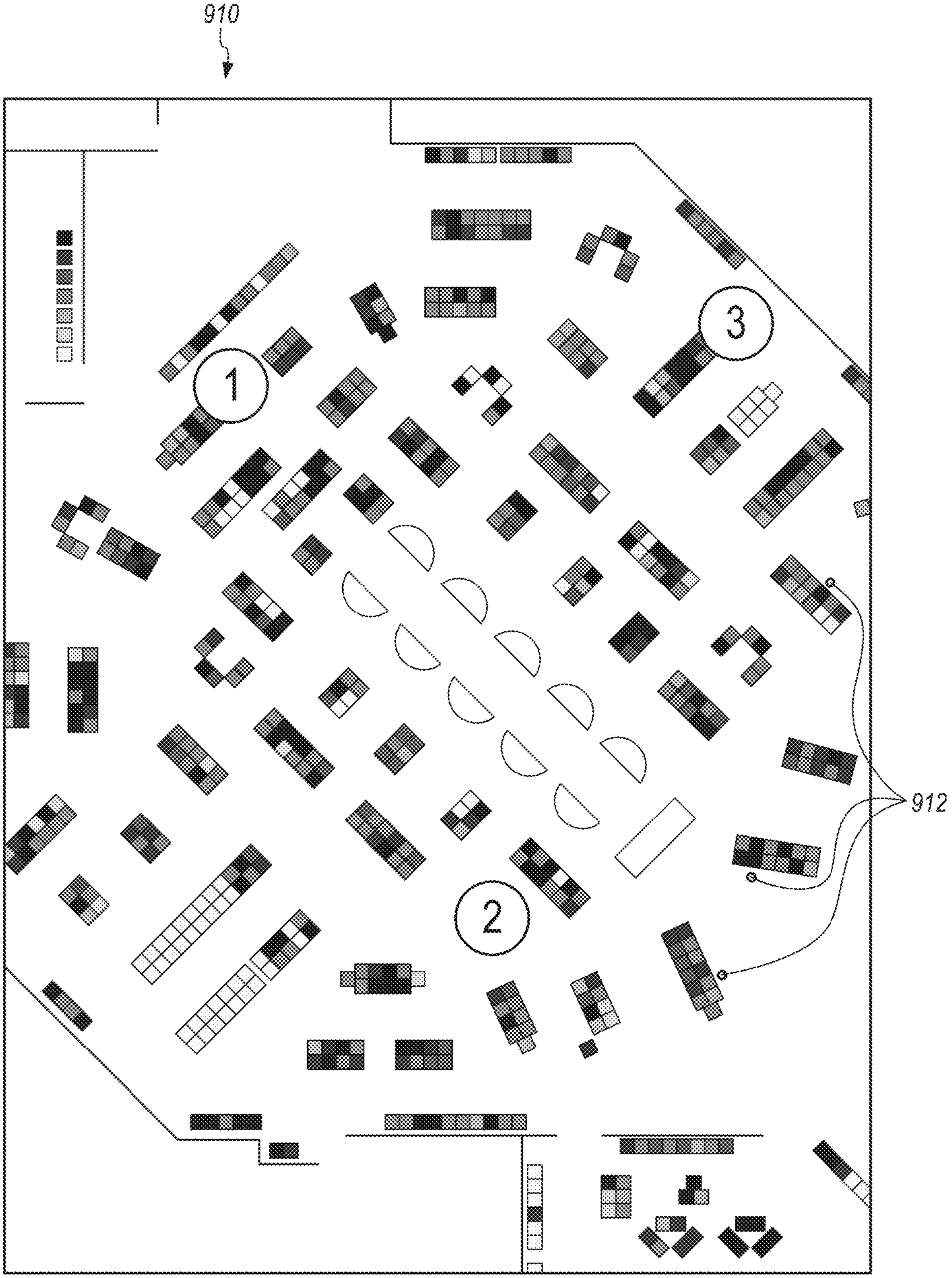
FIG. 9B shows an enlarged view of a casino floor map.

With reference now to FIG. 9B, there is shown an enlarged view of a casino floor map 910. White dots 912 adjacent to certain squares representing gaming machines indicate that the adjacent gaming machine is occupied by a player actively playing that gaming machine. The absence of a white dot 912 indicates that the gaming machine is not occupied by a player actively playing that gaming machine.

Figure 10:
FIG. 10 shows a portrait view for a player's game play, i.e., "my play" player selectable variable, during the player's "last visit."

Referring to FIG. 10 there is shown a portrait view for a player's game play 1000, i.e., "my play" player selectable variable 1002, during the player's "last visit" 1004. The "my play" view 1000 is for a player's game play associated with their loyalty account at the illustrative casino property during the player's previous visit. This my play view shows the player's game play history as a list of EGMs played 1006, number of sessions on each EGM 1008, and length of game play on each EGM 1010.

Figure 11:
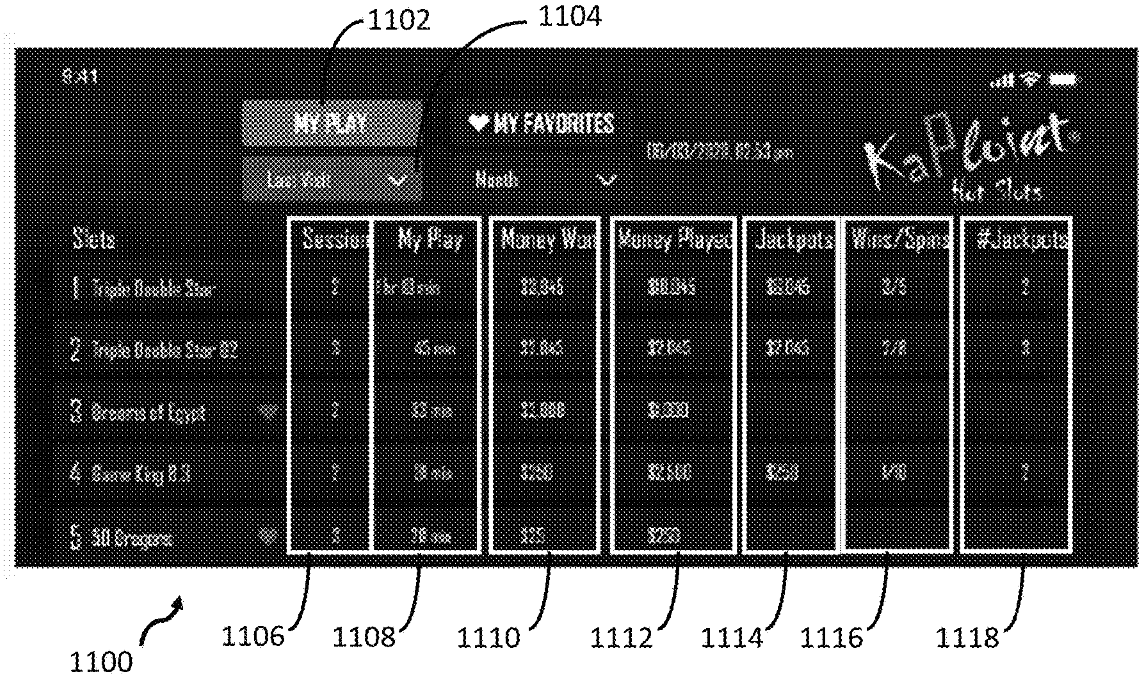
FIG. 11 shows a landscape view of the metrics associated with the "my play" player selectable variable, during the player's "last visit" that includes a session metric, a myplay metric, a money won metric, a money played metric, a jackpots metrics, a wins per spin metric and a number of jackpots metric.

Referring to FIG. 11 there is shown a landscape view 1100 of the metrics associated with the "my play" player selectable variable 1102, during the player's "last visit" 1104 that includes a session metric 1106, a myplay metric 1108, a money won metric 1110, a money played metric 1112, a jackpots metrics 1114, a wins per spin metric 1116 and a number of jackpots metric 1118.

Figure 12:
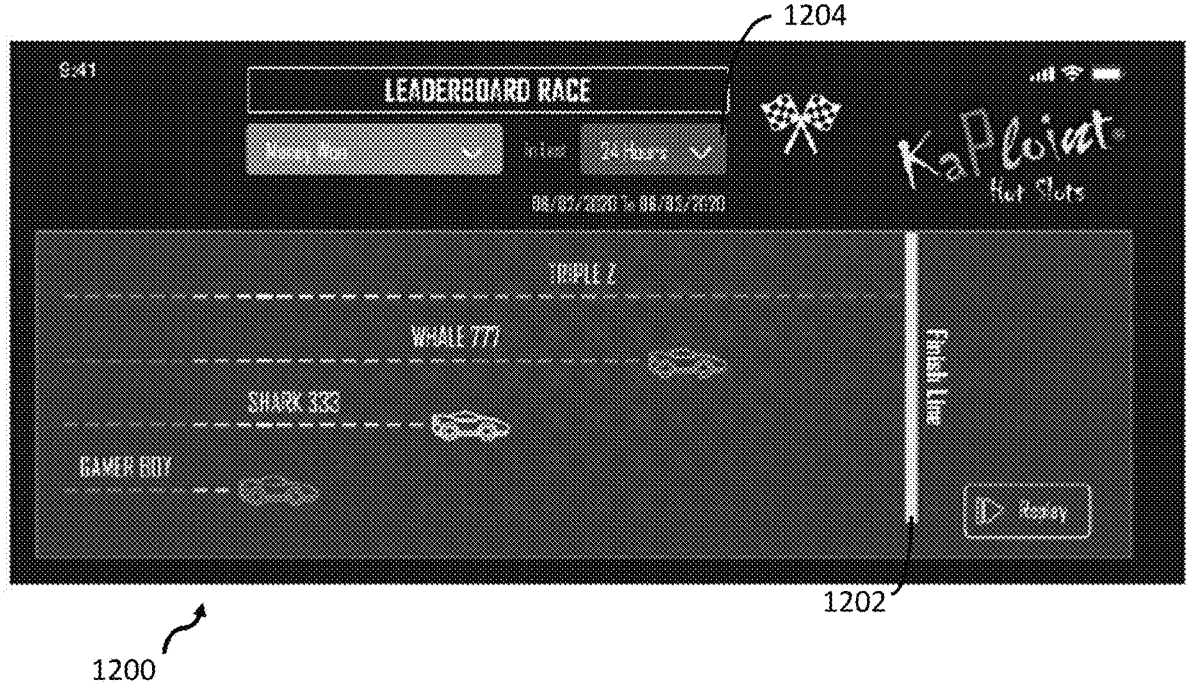
FIG. 12 shows a race car visualization that includes a finish line, which represents the game play results of a tournament game session.

Referring to FIG. 12 there is shown a race car visualization 1200 that includes a finish line 1202, which represents the game play results of a tournament game session. The leaderboard graphic view 1200 of players winning the most money is associated with the player's loyalty account. The time range associated with game play is the previous 24 hours 1204 at the illustrative casino property. The finish line 1202 represents completion of a leaderboard cycle or competition.

Figure 13:
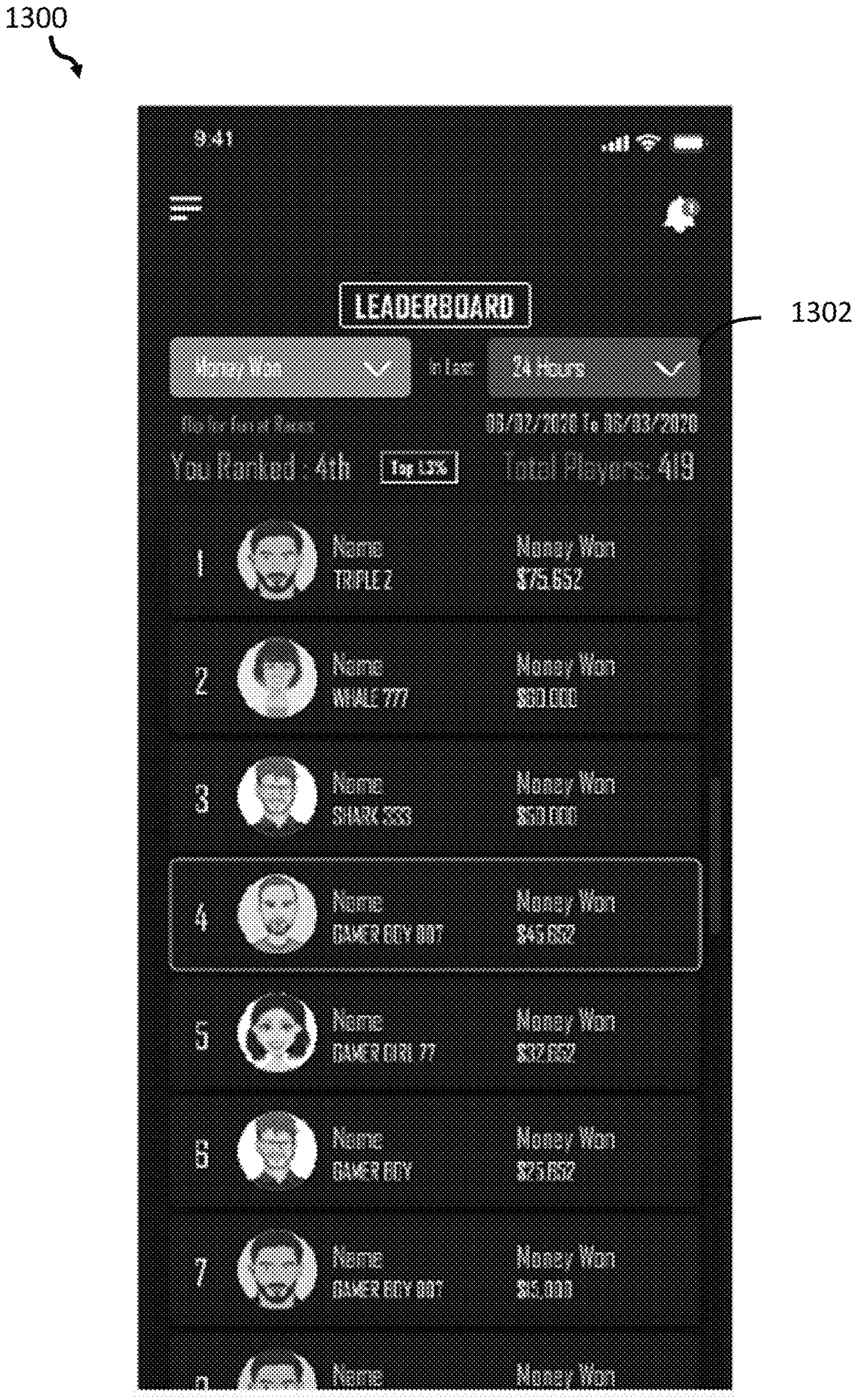
FIG. 13 shows a leaderboard list view of players winning the most money.
Figure 14:
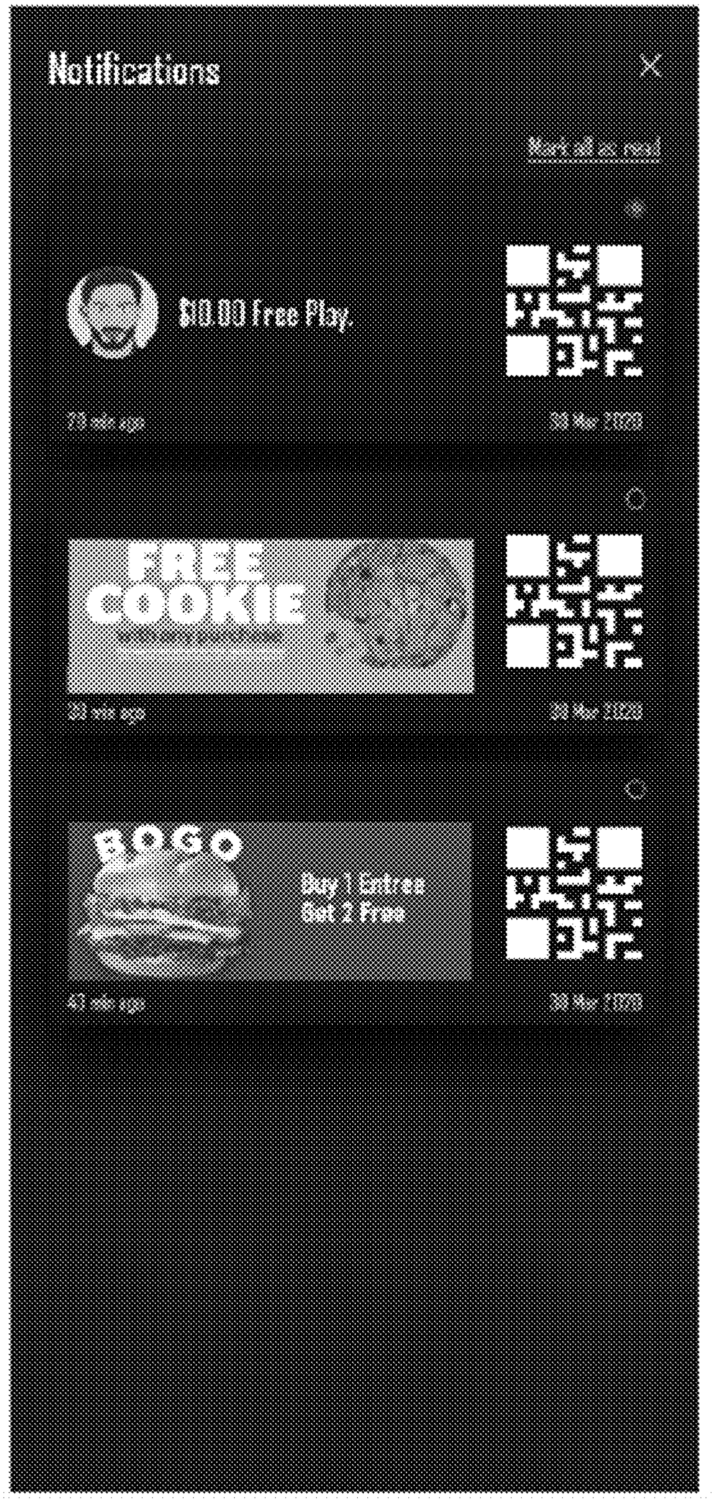
FIG. 14 shows a portrait view of a leaderboard that ranks player results based on a "money won" metric.

Referring to FIG. 13 there is shown a leaderboard list view 1300 of players winning the most money, i.e., player results are ranked based on a "money won" metric, which displays the bonuses or prizes awarded for the registered players. The leaderboard list view 1300 shows players winning the most money, which is associated with game play during the previous 24 hours 1302 at the illustrative casino.

Figure 15A:
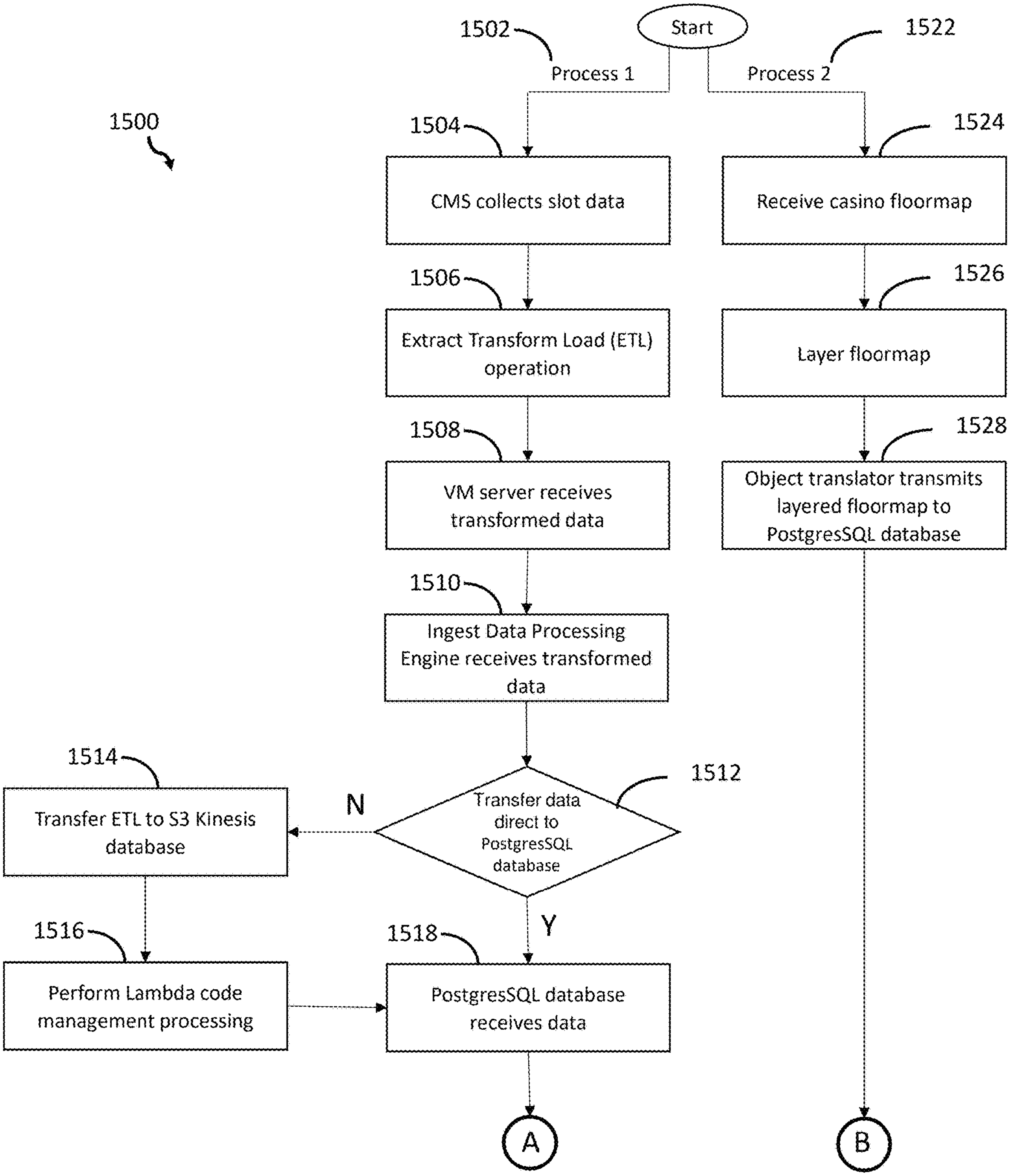
FIG. 15A and FIG. 15B shows a flowchart for an illustrative hot slots player and decision making method.
Figure 15B:
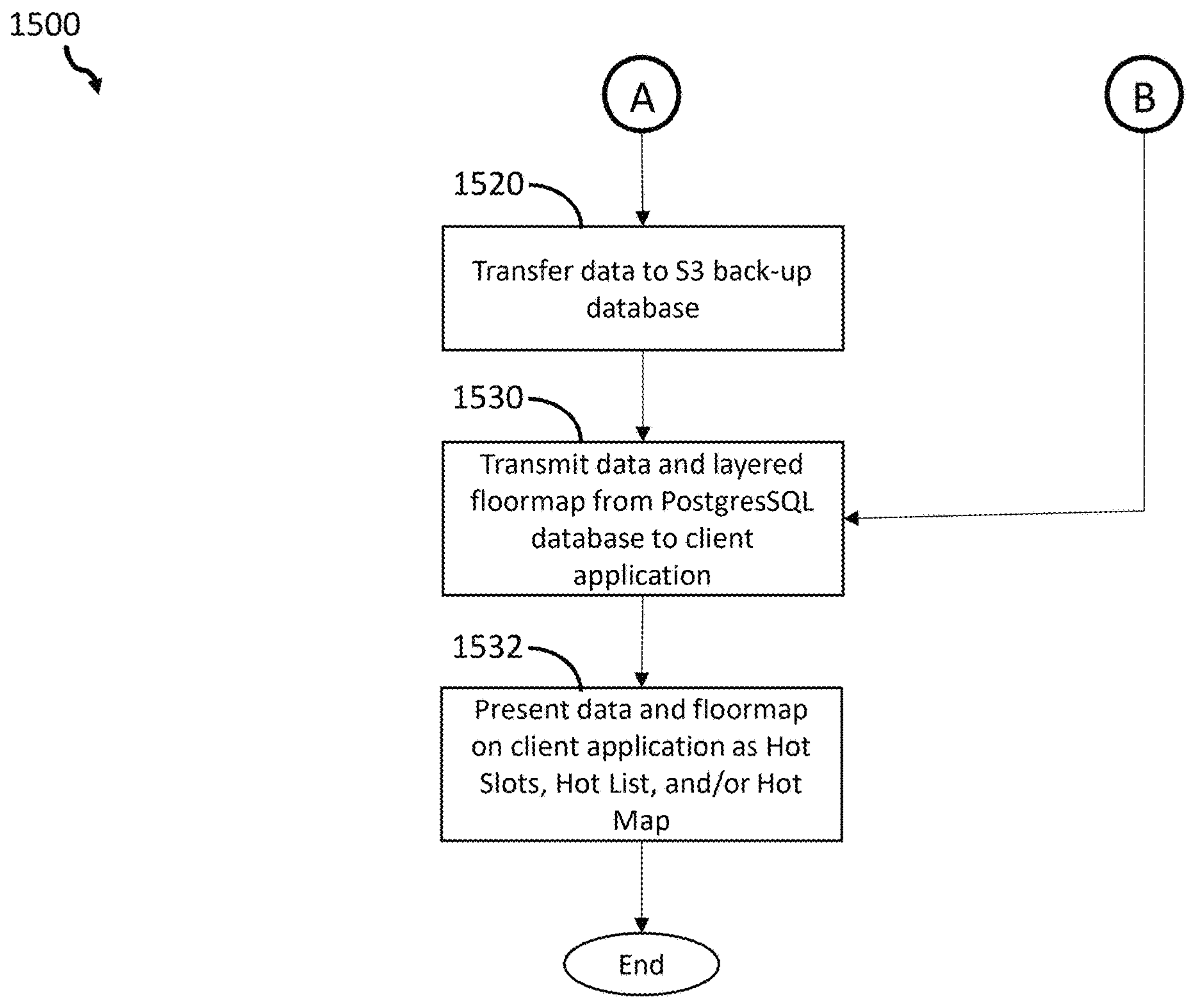

Referring to FIG. 15A and FIG. 15B there is shown a flowchart for an illustrative hot slots player and decision making method 1500. The process steps corresponding to the operation of the player engagement system is presented. Two processes operate in tandem to provide casino data to a network appliance and push insights determined from the casino data to an application operating on a client device. In this manner, the computing resources of the network appliance operate to generate the items and data displayed on the client device in conjunction with the local memory and local processor resident on the client device.

The first process 1502 begins with the collection of EGM data and player data from a CMS 1504. This collection occurs in communication with a network appliance and is facilitated by an ETL operation 1506 that copies the EGM data 180 and the player data 182 into a compatible format for transmission to a secure virtual server 1508. Upon receiving the copied data, an ingest data processing engine 1510 using a suitable low latency, high volume processing operation transforms the EGM data 180 and the player data 182 for transmission to an application running on a client device.

At decision diamond 1512, when the ingest data processing engine determines further processing is required, the EGM data 180 and the player data 182 are transferred to an S3 Kinesis database 1514 and Lambda code management processing is performed 1516 to package the EGM data 180 and the player data 182 for a PostgresSQL database in the cloud 1518. Alternatively, when the ingest data processing engine determines no further processing is required, the EGM data 180 and the player data 182 are transferred directly to the PostgresSQL database in the cloud 1518.

As part of the operating procedure, the PostgresSQL database transfers copies of the EGM data 180 and the player data 182 to an S3 backup database 1520.

Simultaneously or prior to operation of the first process 1502, a second process 1522 begins by receiving casino floor map data from a casino server or other remote server 1524. this floor map data is then layered 1526 to x, y, and rotation values for the elements of the casino floor map, e.g., the EGMs, table games, walls, seats, and labeled destinations. The EGMs are added as polygons to a second layer of the map. The first layer, the background, includes of 'map tiles.' These tiles typically convey roads, topography, or satellite imagery, but can use blank tiles for a background of whatever solid color is preferred. A thirds map layer may be added to display the names of each EGM when the user reaches a sufficient zoom level.

An object translator is then used to transmit the layered floor map data to the PostgresSQL database 1528.

Upon receiving both the EGM data 180 and the player data 182, and the layered floor map data, the data is transmitted from the PostgresSQL database to the client application running on the client device application 1530. The client device application then presents the received data as any of various selected views from hot slots, hot list, and/or hot map 1532.

In some embodiments, the methods, systems, and media disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

The focus of the proposed architecture has been to simplify the streaming of the information from the casino to the database and simplify pushing the data from the database to a mobile application in order to minimize the time it takes to get the data from the casino to the app.

The mobile application may be built with a cross platform hybrid application framework called Ionic. The Ionic framework allows the development of an app using web technologies such as html, CSS, and Javascript, but compile them into a native mobile app. This has some advantages over native development, including the ability to build for both iOS and Android from the same (or close to the same) code. The Ionic framework itself is UI component libraries that utilize web components to make it more modular. The UI components are mobile first and have both iOS and Android versions that are optimized to each platform, providing a more native feel. Ionic Framework comes in multiple Javascript framework variations, including Angular, React, and Vue. In the illustrative embodiment, React is implemented.

Those skilled in the art shall appreciate that the EGMs disclosed herein may include various computer and network related software and hardware, such as programs, operating systems, memory storage devices, data input/output devices, data processors, servers with links to data communication systems, wireless or otherwise, and data transceiving terminals.

The method steps presented herein include steps involving the receiving or displaying of data, and may further include or involve the transmission, receipt, and processing of data through conventional hardware and/or software technology to effectuate the steps as described herein. Those skilled in the art will further appreciate that the precise types of software and hardware used are not vital to the full implementation of the methods so long as players and operators thereof are provided with useful access thereto, either through a mobile device, gaming platform, or other computing platform via a local network, wide area network or global telecommunication network.

Although specific features of various embodiments may be shown in some drawings and not in others, this is for convenience only, and in no way limiting. Those skilled in the art shall appreciate that the apparatus described herein may include various computer and network related software and hardware, such as programs, operating systems, memory storage devices, data input/output devices, data processors, servers with links to data communication systems, wireless or otherwise, and data transceiving terminals. The degree of software modularity for the systems and methods disclosed herein may easily evolve to benefit from the improved performance and anticipated lower cost of the required hardware components.

It is to be understood that the detailed description of illustrative embodiments are provided for illustrative purposes. Thus, the degree of software modularity for the transactional system and method presented above may evolve to benefit from the improved performance and lower cost of the future hardware components that meet the system and method requirements presented. The scope of the claims is not limited to these specific embodiments or examples. Therefore, various process limitations, elements, details, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A casino engagement system for enabling an electronic gaming machine (EGM) selection experience, the system comprising:

a mobile device that includes a processor, a memory, and a display, wherein the mobile device is associated with a player and the mobile device includes a user interface, a display, and an application operating thereon;

a network appliance that includes a processor and a database, wherein the network appliance is operatively coupled to a casino management system that supplies an EGM data set and a casino map data;

a control logic executed by the network appliance processor and the mobile device processor, wherein the control logic performs a sequence of machine executed operations that include:

providing access to the mobile application with a token and then presenting the user interface;

receiving a player input through the user interface, in which the player input includes a time range since a last visit to a casino property, and a player-selectable variables, in which the player-selectable variables includes at least one of a return-to-player value, a jackpot amount, a volatility rating, and a money-won ratio;

filtering the database to generate a filtered EGM data set that includes the selected time range and the player selected variable;

ranking the EGMs of the filtered EGM data set to generate a tiered EGM subset list based on at least one of the player selectable variables;

mapping each EGM of the tiered EGM subset list with a location on the casino map based on map coordinates;

generating an EGM heatmap visualization based on the tiered EGM subset list;

transmitting the EGM heatmap visualization and the tiered EGM subset list from the network appliance to the mobile device, which presents the EGM heatmap visualization and the tiered EGM subset list; and updating the EGM heatmap visualization and the tiered EGM subset list presented on the mobile device when updated EGM data is received by the casino management system that pushes the updated EGM data to the network appliance.

2. The system of claim 1, wherein the ranking is relative and is based upon comparison to performance EGM data for other EGMs within an applicable group that is player selectable through the application.

3. The system of claim 1, wherein the casino map data includes slot floor design data being layered to x, y, and rotation values for elements of a casino floor map.

4. The system of claim 1, wherein the player selectable time range includes an event-specific timeframe of since a last jackpot, and wherein insight values and comparative rankings are determined for a time range spanning from the present back to the last time a jackpot occurred on a gaming device.

5. The system of claim 1, wherein the heatmap visualization is updated in real time by continually setting, for individual gaming machines depicted on the casino floor map, a heat property corresponding to a color representing a range of values for the selected insight and an occupied property corresponding to whether the gaming machine is being actively played.

6. The system of claim 1, wherein the mobile application displays a hot slots view including a list of top ranked EGMs for a player selectable variable, and wherein selecting an insight icon provides location information through the heatmap visualization and a list of the top ranked EGMs for the selected player selectable variable.

7. The system of claim 1, wherein the player-selectable variables further include a high volatility EGM variable and a low volatility EGM variable.

8. The system of claim 1, wherein the system provides the player with a geospatially accurate indoor way finder map enabling the player to locate a desired EGM.

* * * * *